United States Patent
Kondo

(10) Patent No.: US 9,571,967 B2
(45) Date of Patent: Feb. 14, 2017

(54) MOBILE STATION, WIRELESS BASE STATION DEVICE, WIRELESS COMMUNICATION SYSTEM, AND DATA DISTRIBUTION METHOD

(71) Applicant: NEC CORPORATION, Tokyo (JP)

(72) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/414,267

(22) PCT Filed: Jul. 3, 2013

(86) PCT No.: PCT/JP2013/004114
§ 371 (c)(1),
(2) Date: Jan. 12, 2015

(87) PCT Pub. No.: WO2014/010201
PCT Pub. Date: Jan. 16, 2014

(65) Prior Publication Data
US 2015/0195677 A1    Jul. 9, 2015

(30) Foreign Application Priority Data

Jul. 12, 2012   (JP) ................................. 2012-156465

(51) Int. Cl.
*H04M 11/04* (2006.01)
*H04W 4/02* (2009.01)
(Continued)

(52) U.S. Cl.
CPC ............... *H04W 4/021* (2013.01); *H04W 4/06* (2013.01); *H04W 4/206* (2013.01); *H04W 4/22* (2013.01); *H04L 67/26* (2013.01); *H04L 69/28* (2013.01)

(58) Field of Classification Search
None
See application file for complete search history.

(56) References Cited

U.S. PATENT DOCUMENTS 7,246,000 B2    7/2007  Odagawa et al.
2003/0035398 A1*  2/2003  Sato ................... H04L 12/4641
                                                            370/338
(Continued)

FOREIGN PATENT DOCUMENTS

JP    2003-60656    2/2003
JP    2004-348430   12/2004
(Continued)

OTHER PUBLICATIONS

Abe Hiroshi, Base Station and Notification Method, Feb. 16, 2012, JP 2012034096 A.*
(Continued)

*Primary Examiner* — Martin Mushambo
(74) *Attorney, Agent, or Firm* — Young & Thompson

(57) ABSTRACT

To limit users to share information to those located within a certain area, a wireless communication system distributes data from a wireless base station device to a mobile station. The mobile station is a mobile station that transmits data to the wireless base station device of a cell where the mobile station is located, and includes an information identifier assigning unit for assigning an identifier when the data to transmit is of a predetermined kind. The wireless base station device is a wireless base station device that broadcasts a signal to the mobile station in the cell of the wireless base station device, and includes an information distribution determining unit for when the identifier indicating that data is of the predetermined kind is assigned to data received from the mobile station, removing the identifier from the data and generating the signal including the data from which the identifier is removed.

12 Claims, 28 Drawing Sheets

(51) Int. Cl.
 *H04W 4/06* (2009.01)
 *H04W 4/20* (2009.01)
 *H04W 4/22* (2009.01)
 H04L 29/08 (2006.01)
 H04L 29/06 (2006.01)

(56) References Cited

U.S. PATENT DOCUMENTS

2004/0245853 A1 12/2004 Odagawa et al.
2008/0208691 A1 8/2008 Umezawa

FOREIGN PATENT DOCUMENTS

| | | |
|---|---|---|
| JP | 2006-229620 | 8/2006 |
| JP | 2008-077562 | 4/2008 |
| JP | 2008-210304 | 9/2008 |
| JP | 2010-251950 | 11/2010 |
| JP | 2012-034096 | 2/2012 |

OTHER PUBLICATIONS

Tetsuhashi, Hideaki, Emergency Call Transmission Auxiliary System and Emergency Call Transmission Auxiliary Method, Apr. 3, 2008, JP 2008-077562A.*
International Search Report, PCT/JP2013/004114, Sep. 3, 2013.

* cited by examiner

Fig.20

| HANDOVER TIME | IMSI OF MOBILE STATION THAT PERFORMED HANDOVER | IDENTIFIER INDICATING HANDOVER-SOURCE BASE STATION | IDENTIFIER INDICATING HANDOVER-DESTINATION BASE STATION |
|---|---|---|---|
| ... | ... | ... | ... |
| 2012/06/xx 13:23:00 | IMSI=xxxxxxxxxxxxxx1 | BASE STATION IDENTIFIER=A | BASE STATION IDENTIFIER=C |
| 2012/06/xx 13:24:01 | IMSI=xxxxxxxxxxxxxx1 | BASE STATION IDENTIFIER=C | BASE STATION IDENTIFIER=D |
| 2012/06/xx 13:25:00 | IMSI=xxxxxxxxxxxxxx2 | BASE STATION IDENTIFIER=A | BASE STATION IDENTIFIER=B |
| 2012/06/xx 13:25:01 | IMSI=xxxxxxxxxxxxxx3 | BASE STATION IDENTIFIER=A | BASE STATION IDENTIFIER=B |
| 2012/06/xx 13:25:02 | IMSI=xxxxxxxxxxxxxx4 | BASE STATION IDENTIFIER=A | BASE STATION IDENTIFIER=B |

DETECT MOBILE STATION OF IMSI=xxxxxxxxxxxxxx2 TO 4 AS MOBILE-STATION GROUP

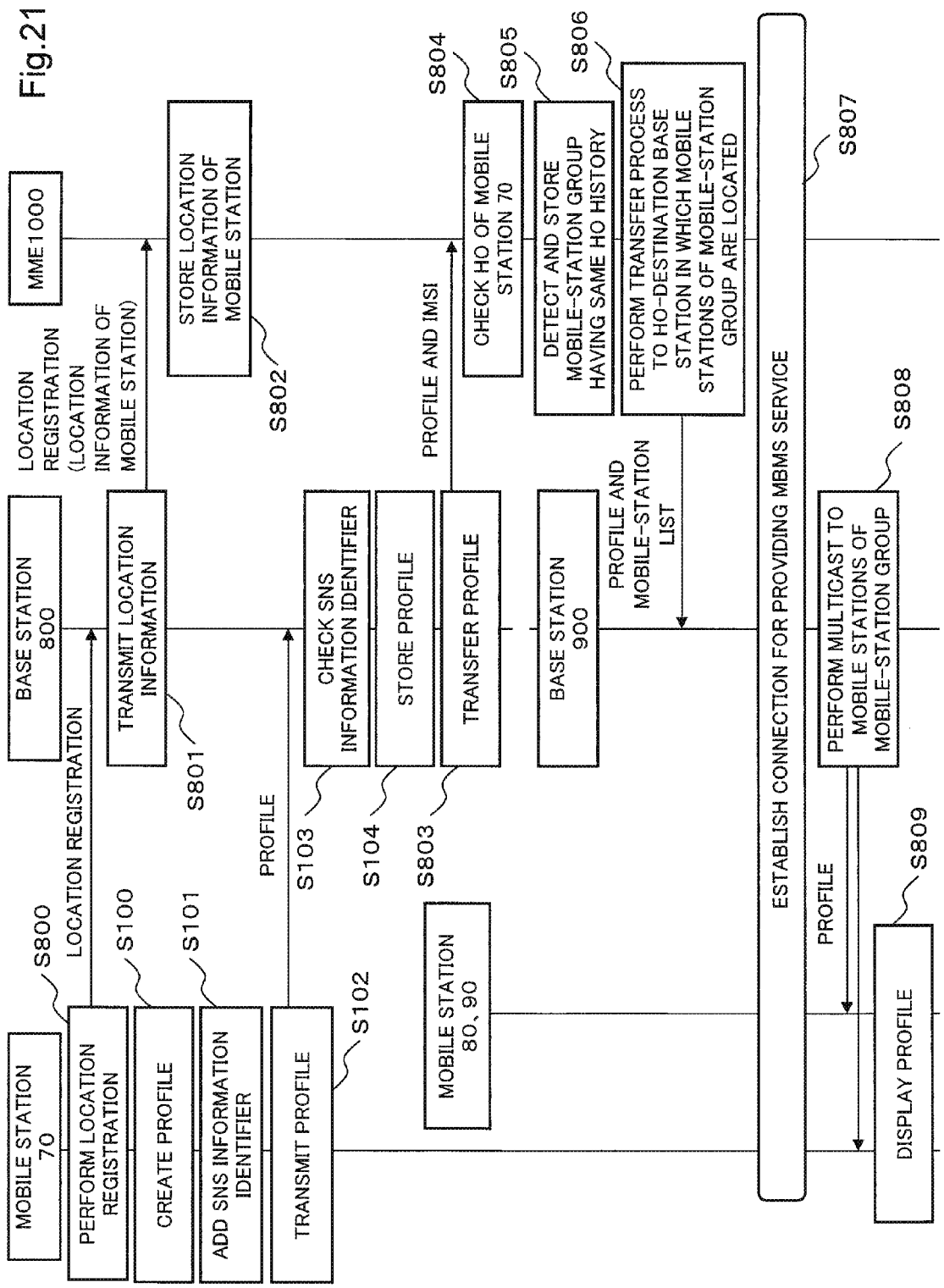

MOBILE STATION, WIRELESS BASE STATION DEVICE, WIRELESS COMMUNICATION SYSTEM, AND DATA DISTRIBUTION METHOD

The present invention relates to a mobile station, a wireless base station device, a wireless communication system, and a data distribution method, and relates particularly to a mobile station, a wireless base station device, a wireless communication system, and a data distribution method that can provide a SNS (Social Networking Service) while limiting users who are to share information to those located within a certain area.

BACKGROUND ART

A SNS (Social Networking Service) has been provided as a kind of network service. Users who use the SNS share information such as profiles among them, to thereby socialize with one another. To share information, each user uses a terminal such as a smartphone or a PC (Personal Computer) to upload information to a SNS server, and to obtain information on other users uploaded to the SNS server.

A communication system for providing the above-described SNS is disclosed in Patent Literature 1 below.

The communication system for providing the SNS according to Patent Literature 1 (referred to as a "communication system of Patent Literature 1" below) includes a community providing server 300, a user terminal 400, and a network 500. The user terminal 400 and the community providing server 300 are connected to each other via the network 500. The community providing server 300 is a server for managing a community service in which particular users are participating on a network. The community providing server 300 includes a room management unit 160, a user management unit 170, a mail creation unit 140, an advertisement management unit 230, and a mail distribution unit 220. The room management unit 160 manages communities and categories thereof, and stores and manages contents contributed to the communities. The user management unit 170 stores profile information of each of the users who are participating in each community service. Moreover, the mail creation unit 140 creates electronic mails each addressed to one or more of the users stored in the user management unit 170. The advertisement management unit 230 adds, to each electronic mail, an advertisement selected on the basis of at least one of the community category, the description introducing the community, and user profile information. Further, the mail distribution unit 220 distributes the electronic mail.

The wireless communication device of Patent Literature 1 operates as will be described below, for example.

The room management unit 160 of the community providing server 300 notifies the mail creation unit 140 that a new content has been contributed to the community. Then, the mail creation unit 140 creates an electronic mail for notification that the new content has been contributed, and passes the electronic mail to the advertisement management unit 230. The advertisement management unit 230 adds, to the electronic mail, an advertisement selected on the basis of user profile information and the like. The mail distribution unit 220 distributes the electronic mail created by the advertisement management unit 230, to a corresponding user (the user terminal 400).

The communication system of Patent Literature 1 adds an advertisement that can attract user interests, to a mail for notification that a new content has been contributed, by the above-described configuration and operations, to thereby enable to share information among users as well as promote the activation of the community service.

CITATION LIST

Patent Literature

[PTL 1] Japanese Patent Application Publication No. 2008-210304

SUMMARY OF INVENTION

Technical Problem

However, the communication system of Patent Literature 1 has a problem that it is not possible to limit users to share information to those located within a certain area. This is because the communication system of Patent Literature 1 does not include any technique for distributing information only to the users located in a certain area.

In addition, there is another problem, due to the above-described problem, that, since each user using the communication system of Patent Literature 1 cannot limit users to share information to those located in the area where the user is, the user cannot necessarily obtain, at the time of disaster, disaster information which is relevant for the area where the user is.

The present invention aims to provide a mobile station, a wireless base station device, a wireless communication system, and a data distribution method that solves the above-described problems.

Solution to Problem

To achieve the above-described object, a mobile station of the present invention is a mobile station that transmits data to a wireless base station device of a cell in which the mobile station is located, and includes an information identifier assigning means for assigning, when the data to transmit is data of a predetermined kind, an identifier indicating that the data is of the predetermined kind, to the data.

To achieve the above-described object, a wireless base station device of the present invention is a wireless base station device for broadcasting a signal to a mobile station located in a cell of the wireless base station device, and includes an information distribution determining means for, when an identifier indicating that data is of a predetermined kind is assigned to data received from the mobile station, removing the identifier from the data and generating the signal including the data from which the identifier is removed.

To achieve the above-described object, a wireless communication system of the present invention is a wireless communication system that distributes data from a wireless base station device to a mobile station. The mobile station is a mobile station that transmits data to a wireless base station device of a cell in which the mobile station is located, and includes an information identifier assigning means for assigning, when the data to transmit is data of a predetermined kind, an identifier indicating that the data is of the predetermined kind, to the data. The wireless base station device is a wireless base station device for broadcasting a signal to a mobile station located in a cell of the wireless base station device, and includes an information distribution determining means for, when an identifier indicating that data is of a predetermined kind is assigned to data received from the mobile station, removing the identifier from the data and generating the signal including the data from which the identifier is removed.

To achieve the above-described object, a data distribution method of the present invention is the data distribution method for distributing data from a wireless base station device to a mobile station and includes: when the data to transmit is of a predetermined kind, the mobile station assigning an identifier indicating that the data is of the predetermined kind, to the data, and transmitting the data to the wireless base station device; and, when the identifier is assigned to the data received from the mobile station, the wireless base station device removing the identifier from the data, and broadcasting the data from which the identifier is removed, to the mobile station.

Advantageous Effects of Invention

According to the present invention, the wireless communication system can limit users who share information to those located in a certain area.

BRIEF DESCRIPTION OF DRAWINGS

FIG. 20 is an example of handover history used in the wireless communication system according to the sixth embodiment of the present invention.

FIG. 21 is a flowchart for illustrating operation of the wireless communication system according to the sixth embodiment of the present invention.

DESCRIPTION OF EMBODIMENTS

Embodiments of the present invention will be described in detail with reference to the drawings.

First Embodiment

Description of Configuration

Figure 1:
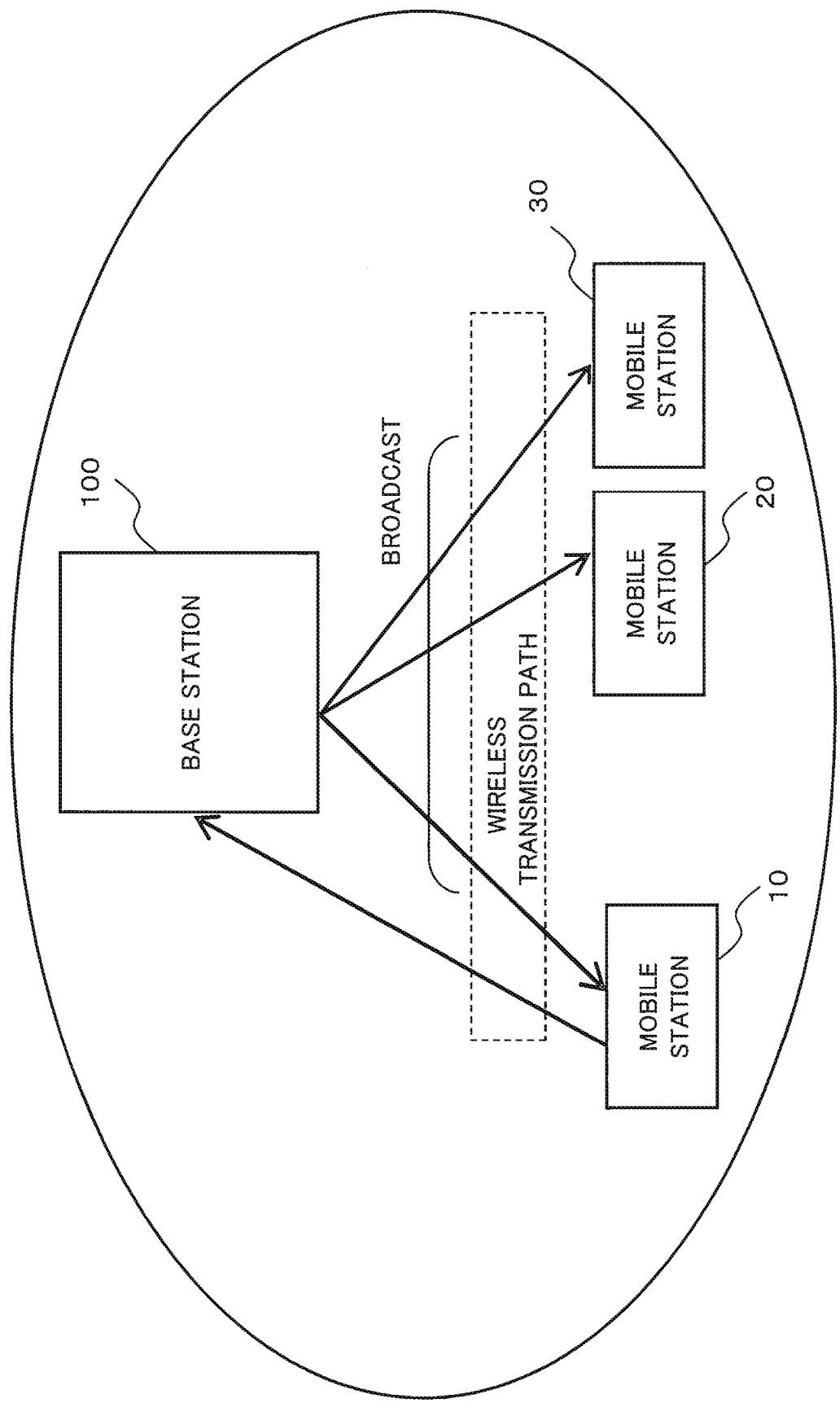
FIG. 1 is a diagram illustrating an example of a configuration of a wireless communication system according to a first embodiment of the present invention.
Figure 2:
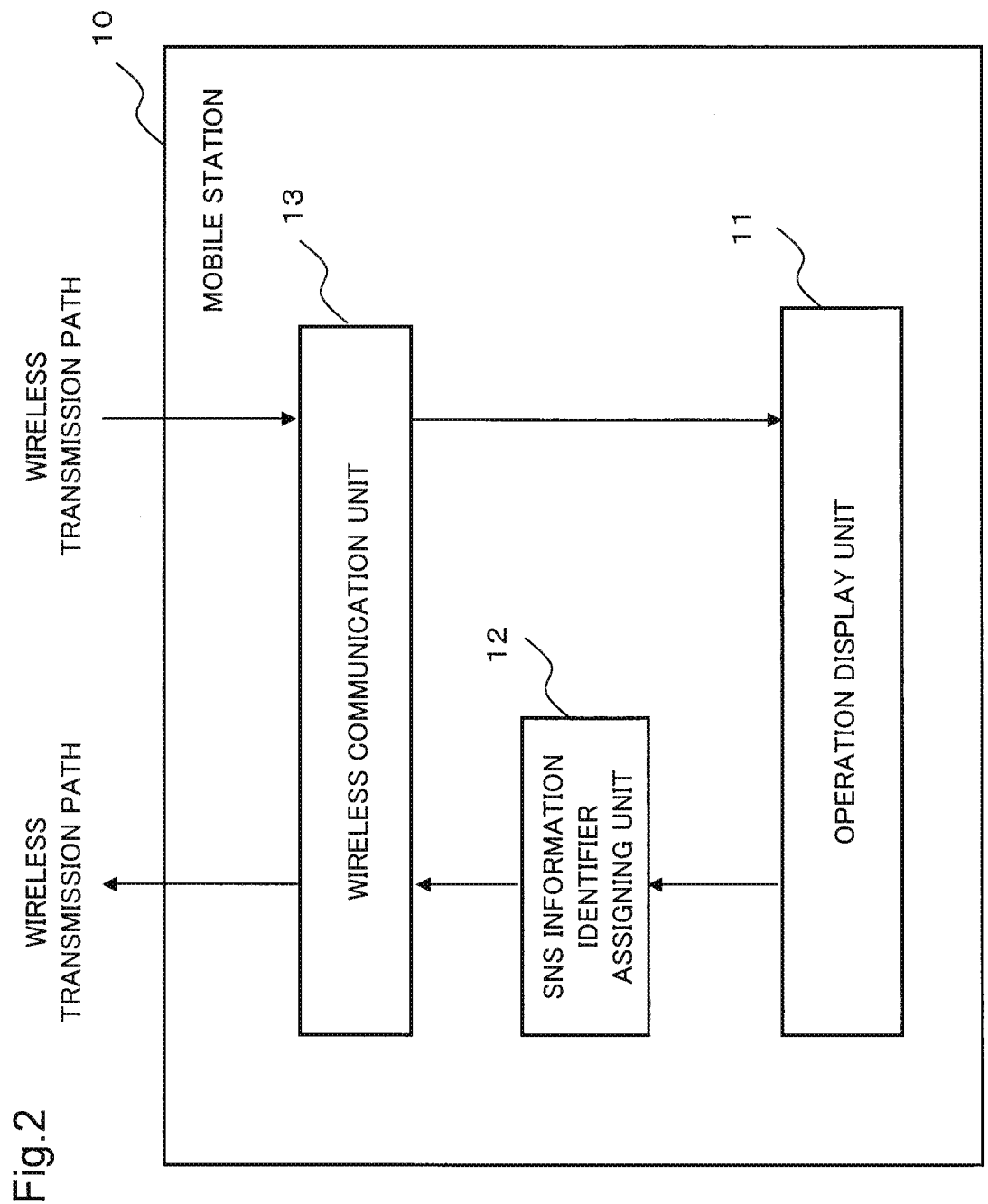
FIG. 2 is a diagram illustrating an example of a configuration of a mobile station included in the wireless communication system according to the first embodiment of the present invention.
Figure 3:
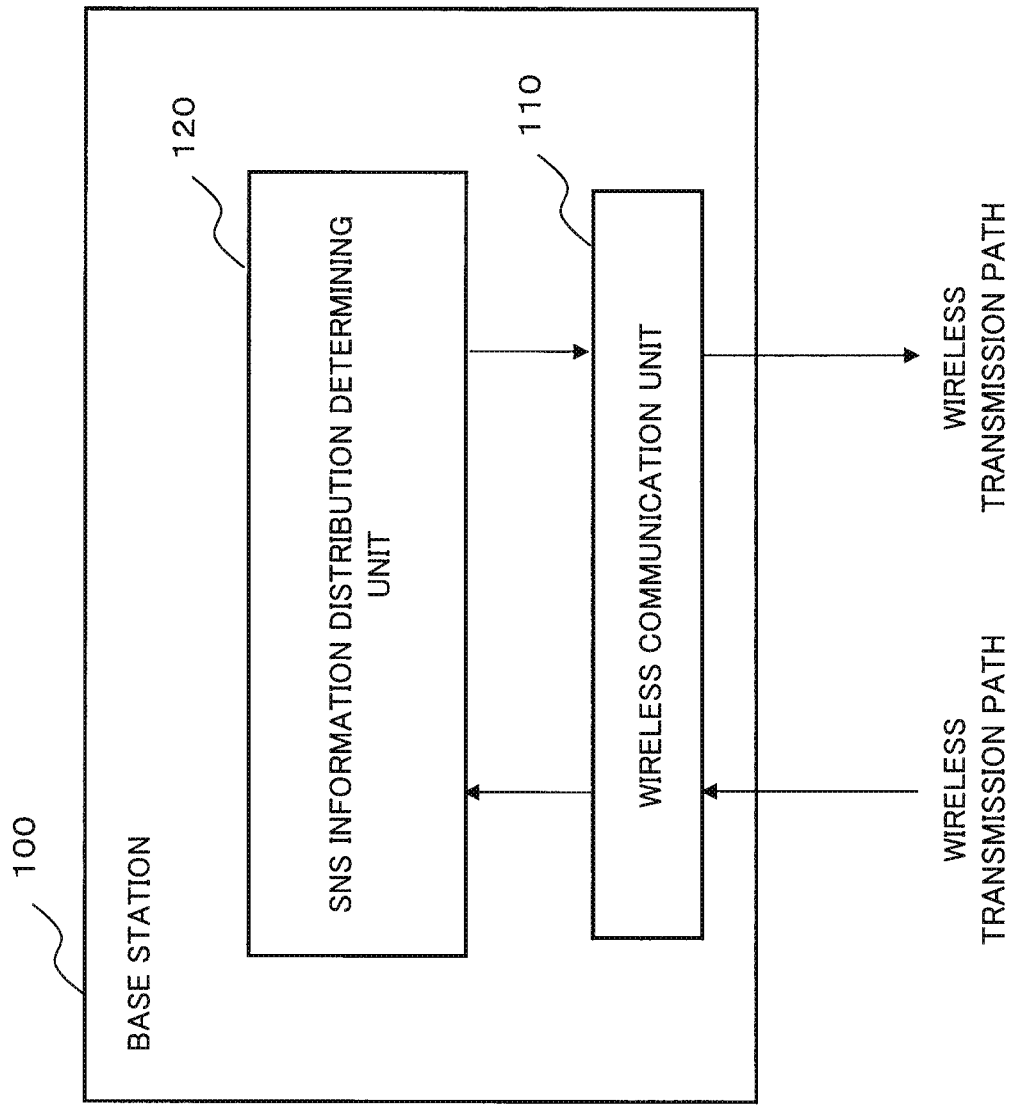
FIG. 3 is a diagram illustrating an example of a configuration of a base station included in the wireless communication system according to the first embodiment of the present invention.

FIG. 1 is a diagram illustrating an example of a configuration of a wireless communication system according to a first embodiment of the present invention. FIG. 2 is a diagram illustrating an example of a configuration of a mobile station included in the wireless communication system according to the first embodiment of the present invention. FIG. 3 is a diagram illustrating an example of a configuration of a base station included in the wireless communication system according to the first embodiment of the present invention.

(1) Configuration of Wireless Communication System According to First Embodiment As illustrated in FIG. 1, the wireless communication system according to the first embodiment includes a base station 100 and mobile stations 10, 20, and 30. In FIG. 1, although the wireless communication system according to the first embodiment includes three mobile stations, the number of mobile stations is not limited to this. The wireless communication system according to the first embodiment may include two mobile stations, or three or more mobile stations. The base station 100 and each of the mobile stations 10, 20, and 30 are connected to each other via a wireless transmission path.

(2) Configuration and Functions of Mobile Stations 10, 20, and 30

A configuration and functions of the mobile stations 10, 20, and 30 will be described below. Since the mobile stations 10, 20, and 30 have the same configuration and functions, description will be given of the configuration and functions of the mobile station 10 as a representative.

First, as illustrated in FIG. 2, the mobile station 10 includes an operation display unit 11, a SNS information identifier assigning unit 12, and a wireless communication unit 13. The operation display unit 11 is connected to the SNS information identifier assigning unit 12 and the wireless communication unit 13. Moreover, the SNS information identifier assigning unit 12 is connected to the wireless communication unit 13. The wireless communication unit 13 is connected to the wireless transmission path.

The operation display unit 11 has an input/output function for managing the interface between a user and the mobile station 10. For example, the operation display unit 11 includes keys that accept input from the user and a display screen. Moreover, the operation display unit 11 converts SNS data input by key operation, into data in the RRC layer (Radio Resource Control layer) specified by the 3GPP, i.e., layer-3 data, by using a known technique, and then outputs the layer-3 data. The 3GPP is the abbreviation of the 3rd Generation Partnership Project. The above-mentioned SNS data may be text data (e.g., text data for several lines of Twitter), or image data or audio data instead of text. Further, the operation display unit 11 converts the input layer-3 data back to the SNS data, and displays the obtained data on the display screen, by using a known technique.

The SNS information identifier assigning unit 12 assigns, to the input layer-3 data, an identifier indicating that the data is SNS data (referred to as an "SNS information identifier" below). Each SNS information identifier is a unique data row in the wireless communication system of this embodiment, and is set in advance in the base station 100 and the mobile stations 10, 20, and 30 by a user of the wireless communication system of this embodiment. The SNS information identifier assigning unit 12 outputs the layer-3 data to which a SNS information identifier is assigned, in such a way that the layer-3 data is added to a RRC message specified by the 3GPP. In adding layer-3 data to a RRC message, the SNS information identifier assigning unit 12 adds the data at a predetermined position of the RRC message. The predetermined position is determined by the user of the wireless communication system of this embodiment, and is set in the SNS information identifier assigning unit 12.

The wireless communication unit 13 performs wireless communications with the corresponding base station 100. Specifically, the wireless communication unit 13 performs a known layer-1,2 transmission process specified by the 3GPP (e.g., encoding, modulation, or the like) on an input RRC message to which layer-3 data is added, to obtain a wireless signal, and then outputs the wireless signal to the wireless transmission path. Moreover, the wireless communication unit 13 performs a known layer-1,2 reception process specified by the 3GPP (e.g., demodulation, decoding, header removal, or the like) on an input broadcast signal, and outputs the obtained data as layer-3 data.

(3) Configuration and Functions of Base Station 100

A configuration and functions of the base station 100 will be described below.

As illustrated in FIG. 3, the base station 100 includes a wireless communication unit 110 and a SNS information distribution determining unit 120. The SNS information distribution determining unit 120 is connected to the wireless communication unit 110. The wireless communication unit 110 is connected to the wireless transmission path.

The wireless communication unit 110 performs wireless communications with mobile stations under the cell of the base station 100 (the mobile stations 10, 20, and 30 in FIG. 1). Specifically, the wireless communication unit 110 performs a known layer-1,2 reception process specified by the 3GPP (e.g., demodulation, decoding, header removal, or the like) on a wireless signal input via the wireless transmission path, to acquire a RRC message, and then outputs the RRC message. Moreover, the wireless communication unit 110 performs a known layer-1,2 transmission process specified by the 3GPP (e.g., encoding, modulation, or the like) on an input broadcast signal, and broadcasts the obtained signal to the mobile stations 10, 20, and 30 under the cell of the base station 100 by using a known technique.

Upon input of a RRC message, the SNS information distribution determining unit 120 extracts data at the predetermined position of the message, and checks whether a SNS information identifier is assigned to the data. Moreover, when a SNS information identifier is assigned to the extracted data, the SNS information distribution determining unit 120 recognizes that the extracted data is layer-3 data, i.e., data including SNS data such as a user profile, disaster information, or the like, and stores the extracted data. Further, the SNS information distribution determining unit 120 reads the stored layer-3 data, removes the SNS information identifier from the read data, and then creates a known broadcast signal including the data after the removal. The SNS information distribution determining unit 120 outputs the created broadcast signal. The broadcast signal may be a known signal to distribute broadcast information, or an emergency-earthquake-early-warning distribution signal used with PWS (Public Warning System) or the like.

[Description of Operation]

Figure 4:
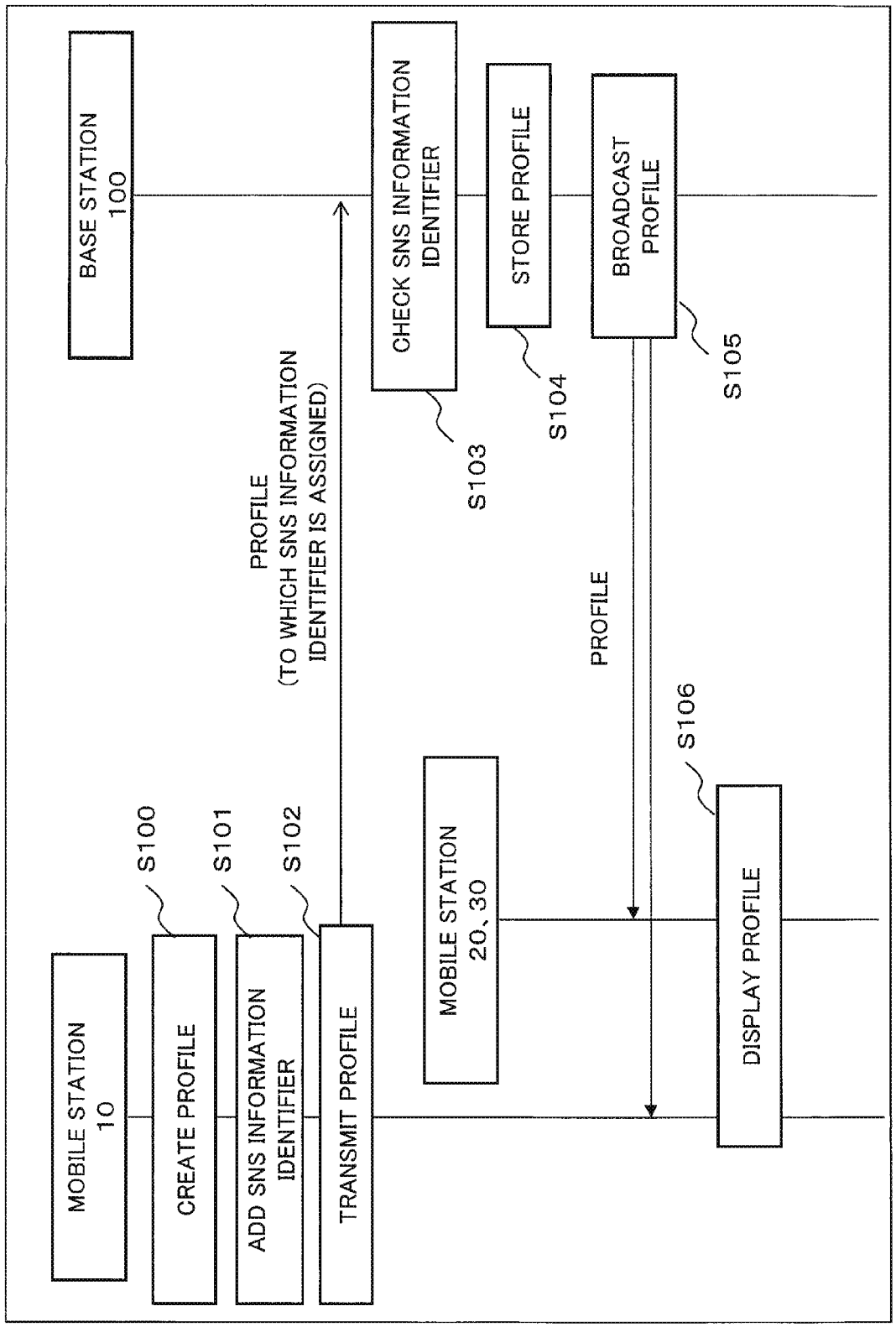
FIG. 4 is a flowchart for illustrating operation of the wireless communication system according to the first embodiment of the present invention.

FIG. 4 is a flowchart for illustrating operation of the wireless communication system according to the first embodiment of the present invention. The operation of the wireless communication system of this embodiment will be described below by using FIG. 4. Note that, although FIG. 4 presents a case of using a user profile as SNS data, SNS data is not limited to this. SNS data may be a character string of several lines including disaster information, or may be image data or audio data, for example.

First, a mobile station (the mobile station 10 in FIG. 4) creates SNS data, e.g., a user profile (S100).

Specifically, the operation display unit 11 of the mobile station 10 converts SNS data, e.g., a user profile, input by key operation by the user, into data in the RRC layer specified by the 3GPP, i.e., layer-3 data, by using a known technique. Then, the operation display unit 11 outputs the layer-3 data to the SNS information identifier assigning unit 12.

Then, the mobile station 10 assigns a SNS information identifier to the created user profile (S101).

Specifically, the SNS information identifier assigning unit 12 of the mobile station 10 assigns a SNS information identifier to the layer-3 data input via the operation display unit 11.

Then, the mobile station 10 transmits the user profile to the base station 100 (S102).

Specifically, the SNS information identifier assigning unit 12 of the mobile station 10 outputs the layer-3 data to which the SNS information identifier is assigned, to the wireless communication unit 13 by adding the layer-3 data to a known RRC message. The above-mentioned known message may be a RRC Connection Request message or a RRC Connection Reconfiguration message, which are specified by the 3GPP. Note that, in adding the layer-3 data to a known RRC message, the SNS information identifier assigning unit 12 adds the layer-3 data at a predetermined position of the RRC message. In the following, the known RRC message to which the layer-3 data is added is referred to as a "transmission message." Thereafter, the wireless communication unit 13 of the mobile station 10 performs a known layer-1,2 transmission process specified by the 3GPP (e.g., encoding, modulation, or the like) on the transmission message input by the SNS information identifier assigning unit 12, to thereby obtain a wireless signal and then outputs the obtained wireless signal to the wireless transmission path.

Then, the base station 100 checks whether a SNS information identifier is assigned to the data received via the wireless transmission path (S103).

Specifically, the wireless communication unit 110 of the base station 100 performs a known layer-1,2 reception process specified by the 3GPP (e.g., demodulation, decoding, or the like) on the wireless signal input via the wireless transmission path, to thereby acquire a known RRC message, and then outputs the known RRC message to the SNS information distribution determining unit 120. The SNS information distribution determining unit 120 extracts data at the predetermined position of the known RRC message, and checks whether a SNS information identifier, i.e., a unique data row, is assigned to the data.

Then, when a SNS information identifier is assigned to the received data, the SNS information distribution determining unit 120 of the base station 100 identifies the received data as SNS data, i.e., data including a user profile, and stores the received data (S104).

Then, the base station 100 broadcasts data stored in S104 described above to the mobile stations under the control of the base station 100 (S105).

Specifically, the SNS information distribution determining unit 120 of the base station 100 reads the data stored in S104, removes the SNS information identifier from the read data, and creates a broadcast signal including the data after the removal. The broadcast signal may be a signal to distribute broadcast information, or may be an emergency-earthquake-early-warning distribution signal of PWS (Public Warning System) or the like. In the case of any of these signals, the SNS information distribution determining unit 120 includes the data after the removal of the SNS information identifier in a predetermined SIB (System Information Block). For example, in the case of using a signal of ETWS (Earthquake and Tsunami Warning System), which is a subsystem of PWS, the SNS information distribution determining unit 120 includes the data after the removal of the SNS information identifier in SIB 10 or SIB 11. This is because, according to what is specified by the 3GPP (Release 8 or newer), base stations supporting ETWS are supposed to notify mobile stations of emergency information by using SIB 10 or SIB 11. In addition to ETWS, CMAS (Commercial Mobile Alert System) is also a subsystem of PWS, and hence the SNS information distribution determining unit 120 may include layer-3 data in a CMAS signal. Alternatively, the broadcast signal may be a CBS (Cell Broadcast Service) signal or a KPAS (Korea Public Alert System). The SNS information distribution determining unit 120 outputs the created broadcast signal to the wireless communication unit 110. The wireless communication unit 110 receives the broadcast signal from the SNS information distribution determining unit 120. The wireless communication unit 110 performs a known layer-1,2 transmission process specified by the 3GPP (e.g., encoding, modulation, or the like) on the received broadcast signal, and then broadcasts the obtained signal to the mobile stations 10, 20, and 30 under the control of the base station 100, by using a known technique.

Then, each of the mobile stations 10, 20, and 30 under the control of the base station 100 receives the broadcast signal, extracts the user profile by using a known technique, and displays the user profile on the display screen thereof (S106).

Specifically, the wireless communication unit 13 of each of the mobile stations 10, 20, and 30 receives the broadcast signal, performs a known layer-1,2 reception process specified by the 3GPP (e.g., demodulation, decoding, or the like) on the received signal, and thereby extracts layer-3 data included at the predetermined position of the received signal. The wireless communication unit 13 of each of the mobile stations 10, 20, and 30 outputs the extracted layer-3 data to the operation display unit 11 thereof. The operation display unit 11 of each of the mobile stations 10, 20, and 30 converts the layer-3 data input by the wireless communication unit 13, back to the user profile by using a known technique, and then displays the user profile on the display screen.

[Description of Effects]

According to this embodiment, the wireless communication system can limit users to share information to those located in a certain area.

The reason is that each mobile station assigns a SNS information identifier to SNS data, and the base station recognizes whether received data is SNS data on the basis of the presence or absence of the SNS information identifier, and broadcasts, when the received data is SNS data, the data to the mobile stations under the cell of the base station. As a result, the SNS data is distributed only to the users under the cell of the base station, and hence the wireless communication system of this embodiment can limit the users to share information to those located within a certain area (in the cell under the control of the base station).

Note that, since each user using the wireless communication system of this embodiment can share information only with the users located within the area (in the cell) where the user is, it is possible for the user, at the time of disaster, to constantly acquire disaster information relevant for the area where the user is.

Moreover, unlike the wireless communication system of Patent Document 1, the wireless communication system of this embodiment does not access the SNS server. The wireless communication system of this embodiment enables information sharing without delay even at the time of SNS server congestion.

Second Embodiment

Next, a second embodiment of the present invention will be described.

Although description will be given below of a case of using a user profile as SNS data as in the first embodiment, the SNS data is not limited to this. The SNS data may be a character string of several lines, or may be image data or audio data, for example.

[Description of Configuration]

Figure 5:
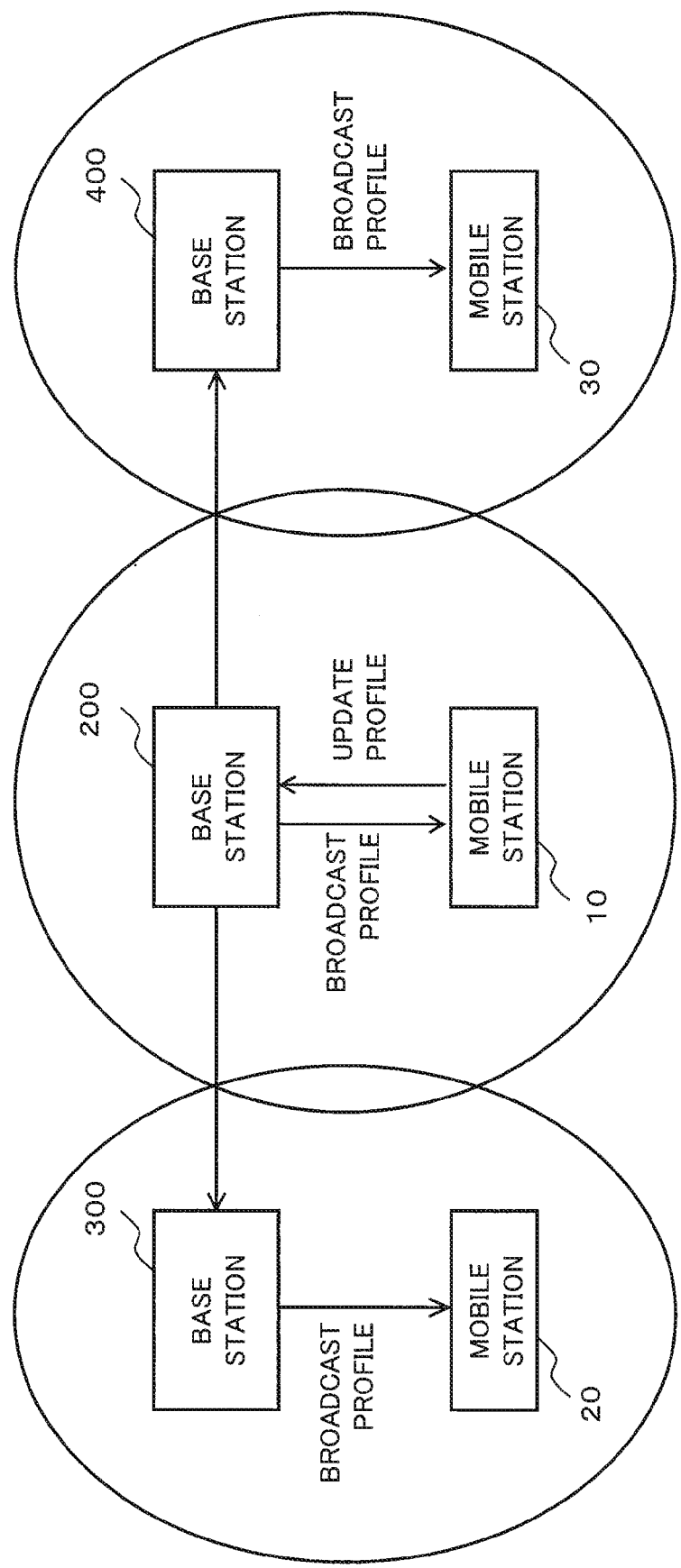
FIG. 5 is a diagram illustrating an example of a configuration of a wireless communication system according to a second embodiment of the present invention.
Figure 6:
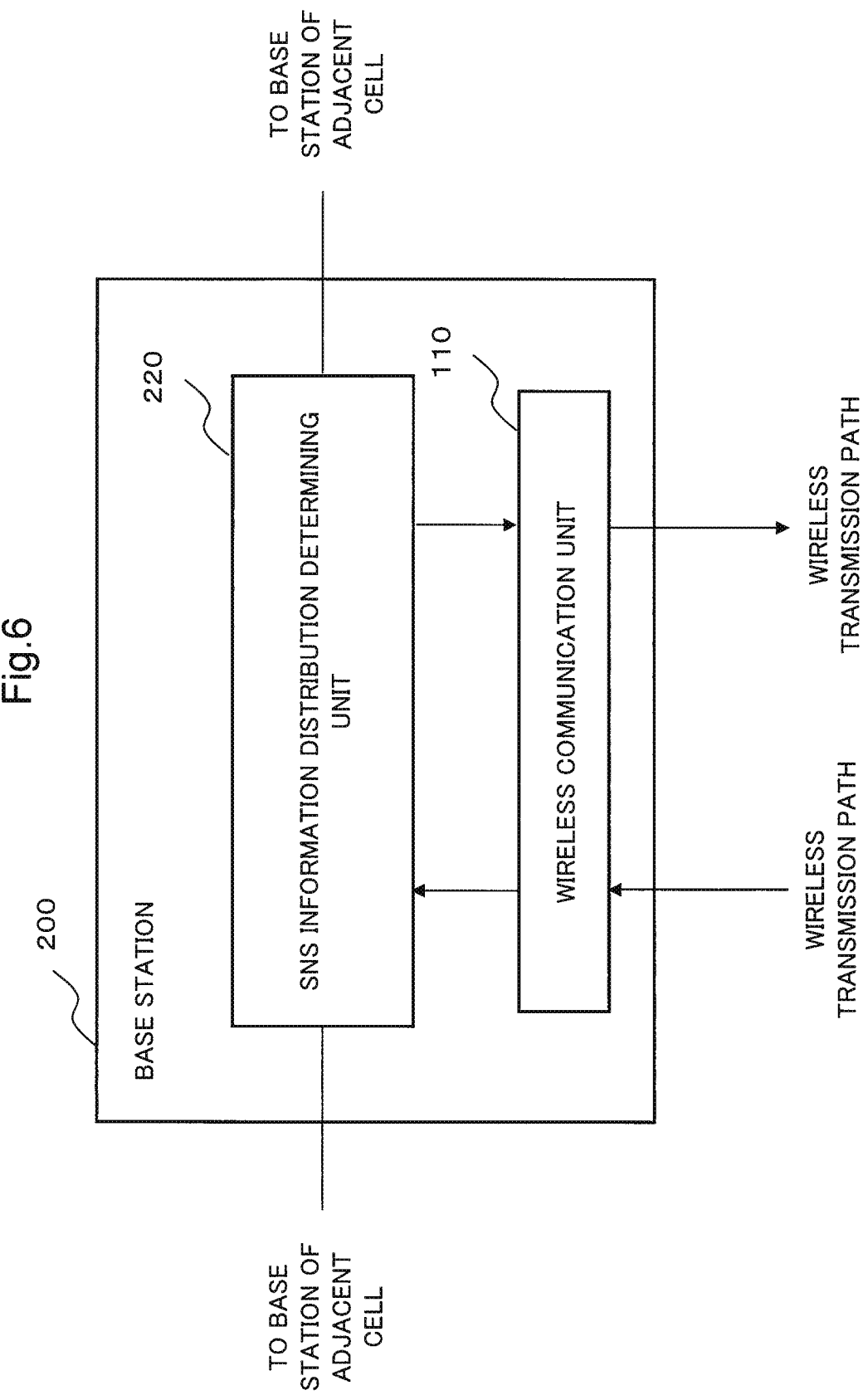
FIG. 6 is a diagram illustrating an example of a configuration of a base station included in the wireless communication system according to the second embodiment of the present invention.

FIG. 5 is a diagram illustrating an example of a configuration of a wireless communication system according to the second embodiment of the present invention. In addition, FIG. 6 is a diagram illustrating an example of a configuration of a base station included in the wireless communication system according to the second embodiment of the present invention.

As illustrated in FIG. 5, the wireless communication system according to the second embodiment includes a base station 200 instead of the base station 100, and further includes mobile stations 300 and 400 each adjacent to the base station 200. The base stations 200, 300, and 400 have the same functions. The base station 200 is connected to each of the base station 300 and the base station 400 via a wired line. Moreover, as illustrated in FIG. 6, each of the base stations 200, 300, and 400 includes a SNS information distribution determining unit 220 instead of the SNS information distribution determining unit 120. The SNS information distribution determining unit 220 is connected to the SNS information distribution determining unit 220 of each adjacent base station.

The SNS information distribution determining unit 220 stores a list of adjacent base stations (referred to as an "adjacent-base-station list" below) by using a known technique such as SON (Self Organizing Network) or the like, and identifies adjacent base stations from the adjacent-base-station list. The SNS information distribution determining unit 220 transfers stored data to the adjacent base stations. Moreover, the SNS information distribution determining unit 220 stores data input by the SNS information distribution determining unit 220 of each adjacent base station.

Since the configuration and functions other than those described above are the same as those of the wireless communication system according to the first embodiment, the same numerals are used for the same configuration and functions while description thereof is omitted.

[Description of Operation]

Figure 7:
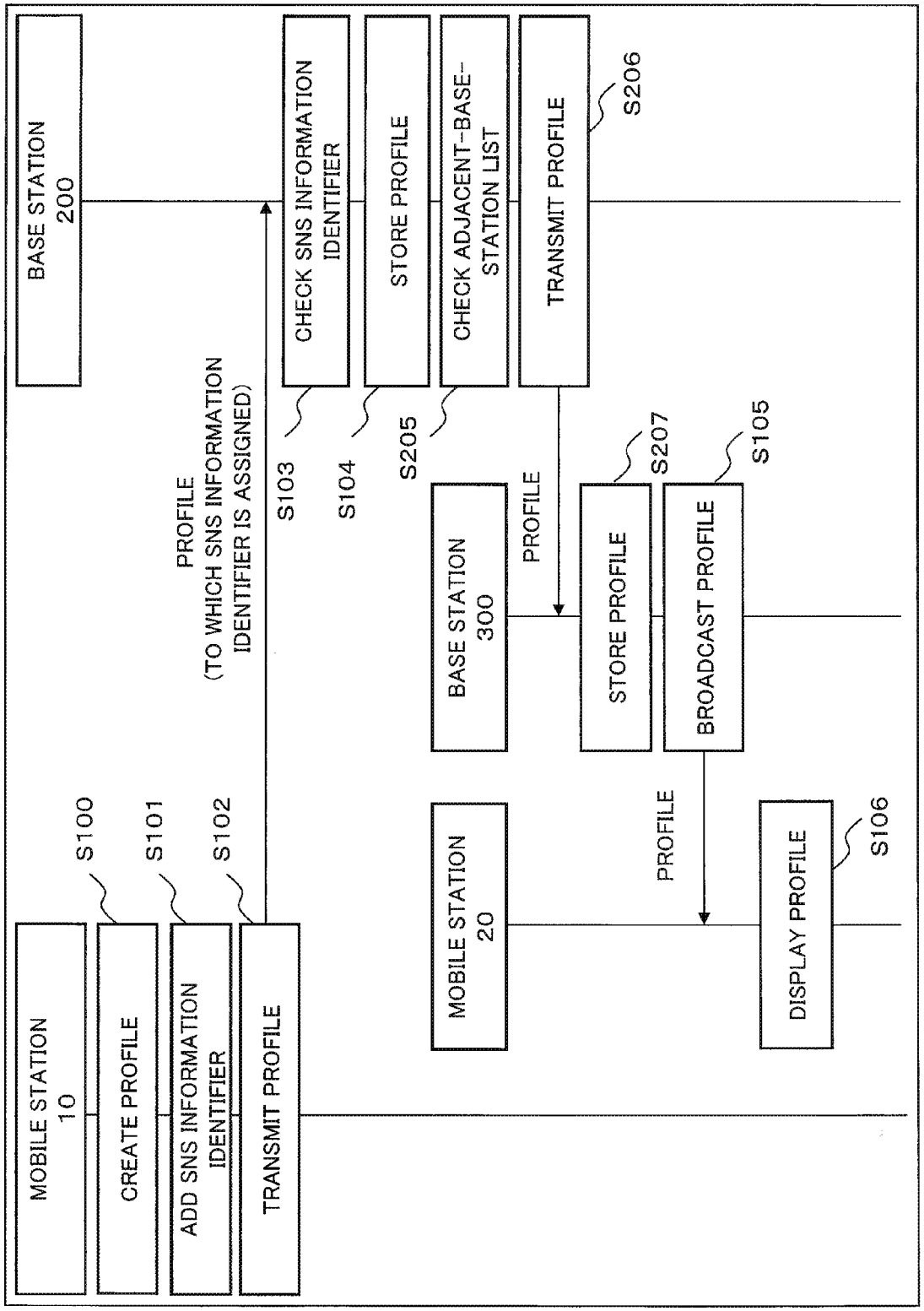
FIG. 7 is a flowchart for illustrating operation of the wireless communication system according to the second embodiment of the present invention.

FIG. 7 is a flowchart for illustrating operation of the wireless communication system according to the second embodiment of the present invention. The wireless communication system according to the second embodiment is a system that expands the area to distribute SNS data to the cells of the adjacent base stations, and the operation will be described below by using FIG. 7.

First, the mobile station 10 and the base station 200 perform S100 to S104 described above, and the base station 200 stores the data, e.g., data including a user profile, received from the mobile station 10.

Thereafter, the SNS information distribution determining unit 220 of the base station 200 checks the stored adjacent-base-station list, to thereby identify adjacent base stations (S205).

Then, the SNS information distribution determining unit 220 of the base station 200 transfers the stored data (the data including the user profile) to the SNS information distribution determining unit 220 of each of the adjacent base station 300 and base station 400 (S206).

In this step, the SNS information distribution determining unit 220 of the base station 200 may transfer the stored data to the SNS information distribution determining unit 220 of each of the adjacent base stations 300 and 400 by using a known message. The known message may be an X2 Setup Request or an ENB CONFIGURATION UPDATE, for example.

Then, upon receipt of the data transferred by the SNS information distribution determining unit 220 of the adjacent base station 200, the SNS information distribution determining unit 220 of each of the adjacent base stations 300 and 400 stores the received data (S207).

Then, each base station performs S105 described above, and broadcasts the stored data to the mobile stations under the cell of the base station. In the case of FIG. 7, the base stations 200, 300, and 400 broadcast the data (the data including the user profile) respectively to the mobile stations 10, 20, and 30 each being under the cell of the base station.

The other operations are the same as those in the first embodiment, and hence detailed description thereof is omitted.

[Description of Effects]

According to this embodiment, the wireless communication system can share information also with the users located in the cell of each adjacent base station. This is because a base station that has received SNS data from a mobile station transfers the SNS data to each adjacent base station, and the adjacent base station distributes the transferred data to the mobile stations under the control of the base station.

Third Embodiment

Next, a third embodiment of the present invention will be described.

[Description of Configuration]

Figure 8:
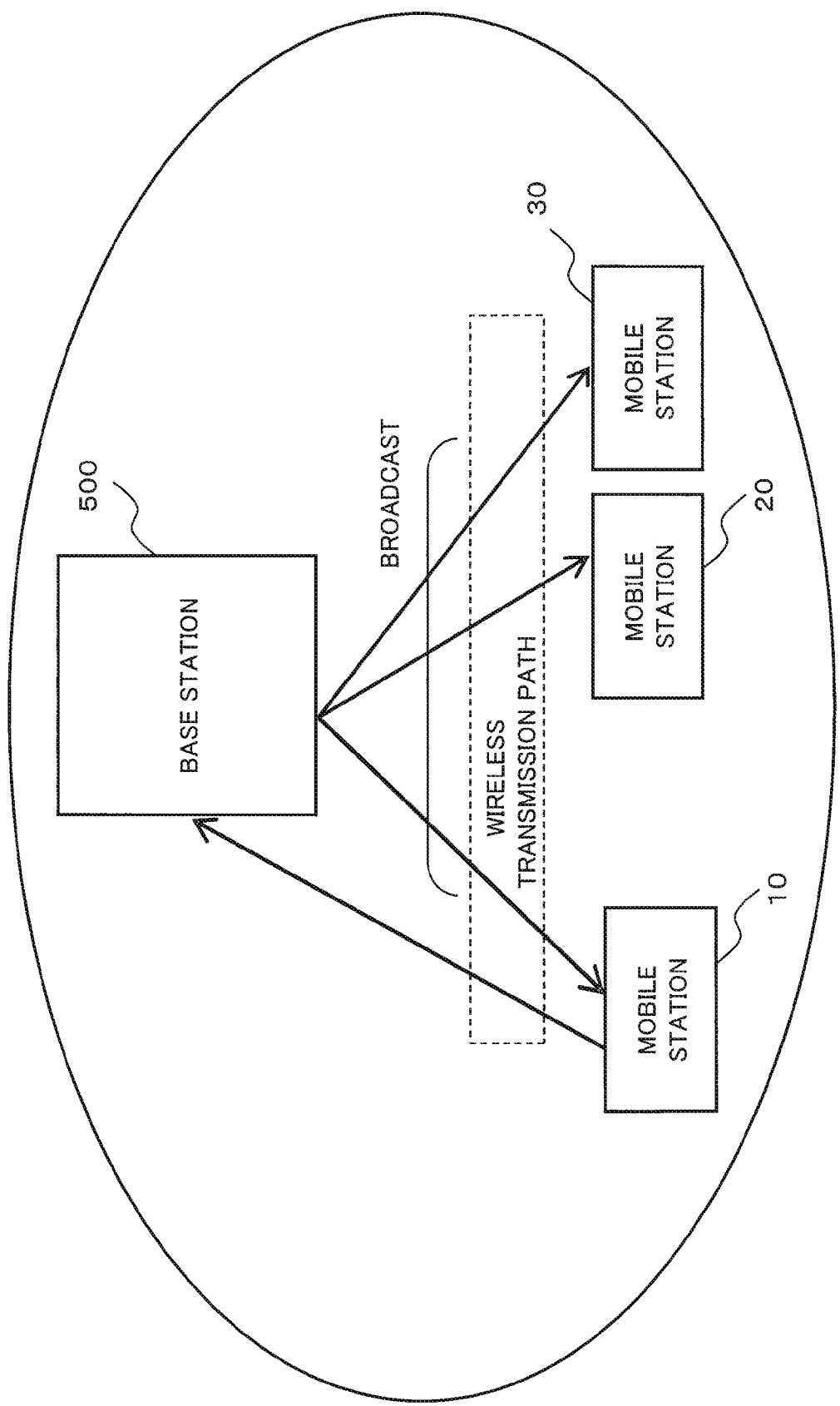
FIG. 8 is a diagram illustrating an example of a configuration of a wireless communication system according to a third embodiment of the present invention.
Figure 9:
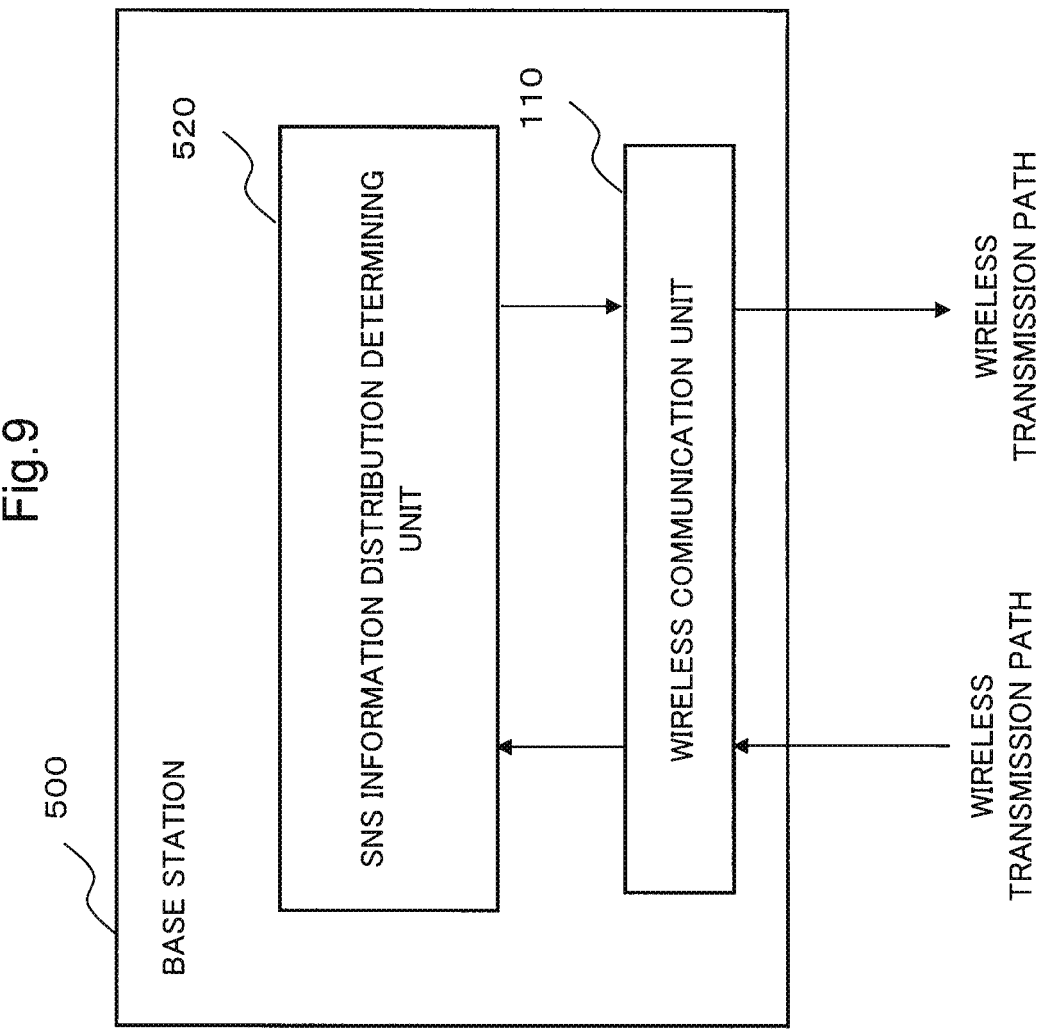
FIG. 9 is a diagram illustrating an example of a configuration of a base station included in the wireless communication system according to the third embodiment of the present invention.

FIG. 8 is a diagram illustrating an example of a configuration of a wireless communication system according to the third embodiment of the present invention. FIG. 9 is a diagram illustrating an example of a configuration of a base station included in the wireless communication system according to the third embodiment of the present invention.

As illustrated in FIG. 8, the wireless communication system according to the third embodiment includes a base station 500 instead of the base station 100. Moreover, as illustrated in FIG. 9, the base station 500 includes a SNS information distribution determining unit 520 instead of the SNS information distribution determining unit 120.

The SNS information distribution determining unit 520 obtains the locating times of the respective mobile stations 10, 20, and 30 located in the cell of the base station 500, by using a known function. Moreover, the SNS information distribution determining unit 520 identifies the mobile station from which received data, e.g., data including a user profile, was transmitted, by using a known function. The SNS information distribution determining unit 520 judges whether the locating time of the mobile station that transmitted the data including the user profile is longer than or equal to a predetermined time period. The predetermined time period is set in the SNS information distribution determining unit 520 by a user of the wireless communication system of this embodiment. When the locating time of the mobile station that transmitted the data including the user profile is longer than or equal to the predetermined time period, the SNS information distribution determining unit 520 broadcasts the stored data to the mobile stations 10, 20, and 30.

Since the configuration and functions other than those described above are the same as those of the wireless communication system according to the first embodiment, the same numerals are used for the same configuration and functions while description thereof is omitted.

[Description of Operation]

Figure 10:
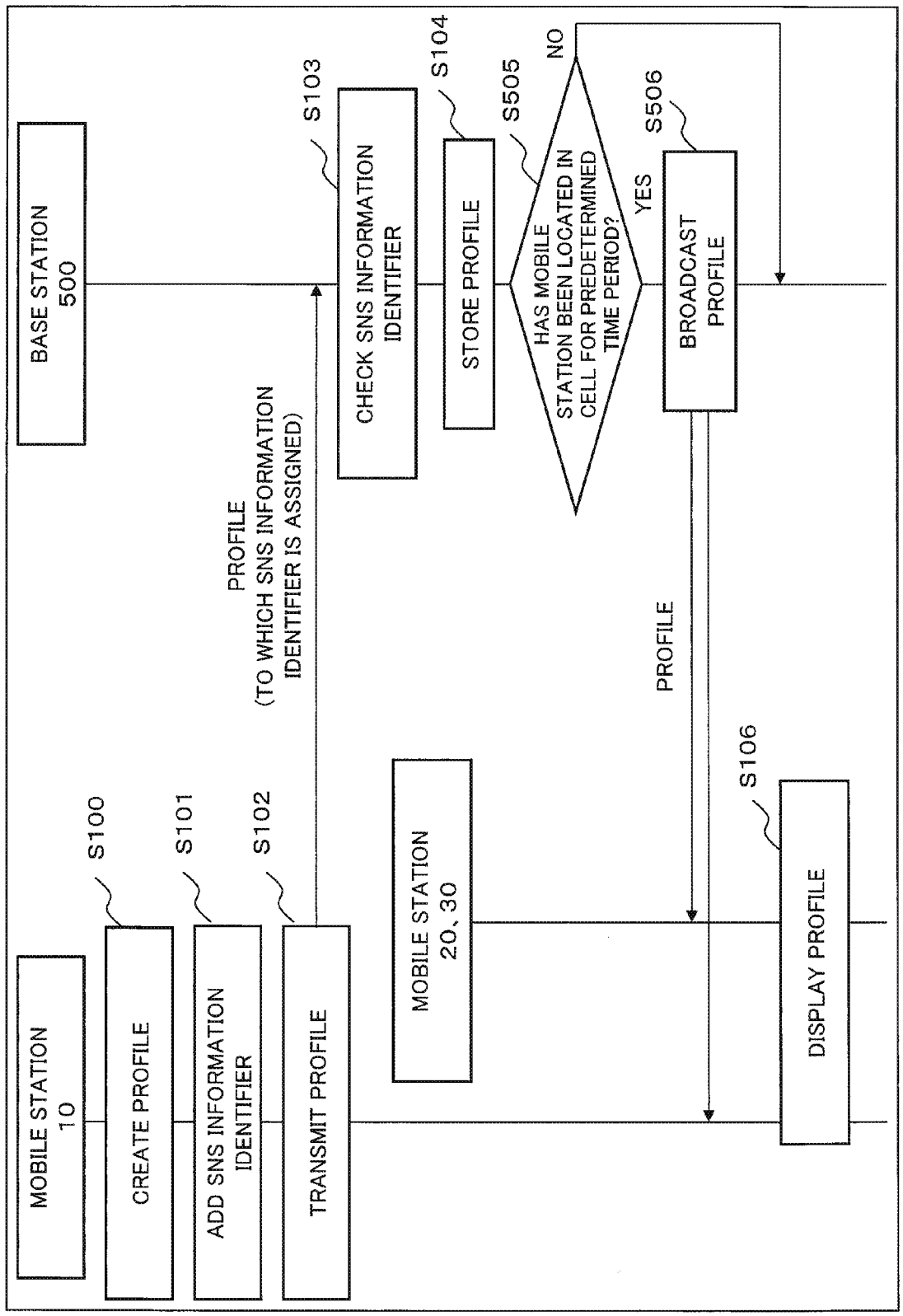
FIG. 10 is a flowchart for illustrating operation of the wireless communication system according to the third embodiment of the present invention.

FIG. 10 is a flowchart for illustrating operation of the wireless communication system according to the third embodiment of the present invention.

First, the mobile station 10 and the base station 500 perform S100 to S104 described above, and the base station 500 stores the data, e.g., data including a user profile, received from the mobile station 10. In this step, the SNS information distribution determining unit 520 of the base station 500 finds, by a known function, that the data including the user profile was transmitted by the mobile station 10. Moreover, the SNS information distribution determining unit 520 of the base station 500 obtains, by a known function, the locating times of the respective mobile station 10, 20, and 30 located in the cell under the control of the base station 500.

Then, the SNS information distribution determining unit 520 of the base station 500 judges whether the locating time of the mobile station 10 that transmitted the data including the user profile is longer than or equal to the predetermined time period (S505).

Then, when the locating time of the mobile station 10 is longer than or equal to the predetermined time, the base station 500 broadcasts the stored data including the user profile to the mobile stations under the cell of the base station 500 (S506).

Specifically, when the locating time of the mobile station 10 is longer than or equal to the predetermined time period, the SNS information distribution determining unit 520 of the base station 500 reads the stored data, removes a SNS information identifier from the read data, and creates a broadcast signal including data after the removal. Then, the SNS information distribution determining unit 520 outputs the created signal to the wireless communication unit 110, and the wireless communication unit 110 broadcasts the signal to the mobile stations 10, 20, and 30.

When the locating time of the mobile station 10 is shorter than the predetermined time period, the SNS information distribution determining unit 520 of the base station 500 does not output the stored data to the wireless communication unit 110. Consequently, the stored data is not broadcasted from the base station 500 to the mobile stations 10, 20, and 30.

[Description of Effects]

According to this embodiment, the wireless communication system can prevent broadcasting of SNS data (user profile) transmitted by a mobile station moving to the cell of a different base station after a short time period. This is because the base station included in the wireless communication system according to the third embodiment obtains the time in which the mobile station that transmitted SNS data has been in the cell of the base station (referred to as "locating time" below), and broadcasts the SNS data when the locating time is longer than or equal to the predetermined time.

Fourth Embodiment

Next, a fourth embodiment of the present invention will be described.

[Description of Configuration]

Figure 11:
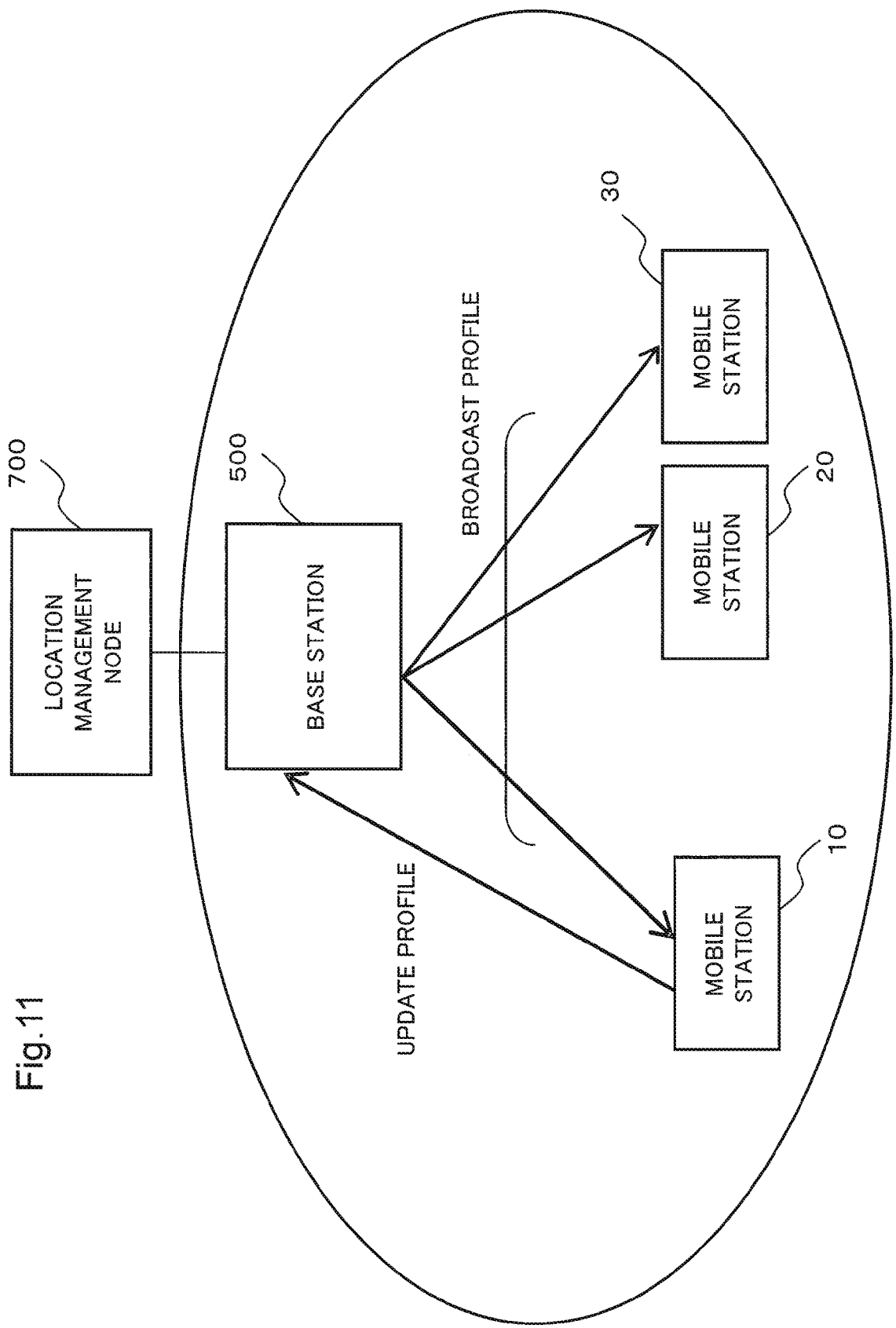
FIG. 11 is a diagram illustrating an example of a configuration of a wireless communication system according to a fourth embodiment of the present invention.
Figure 12:
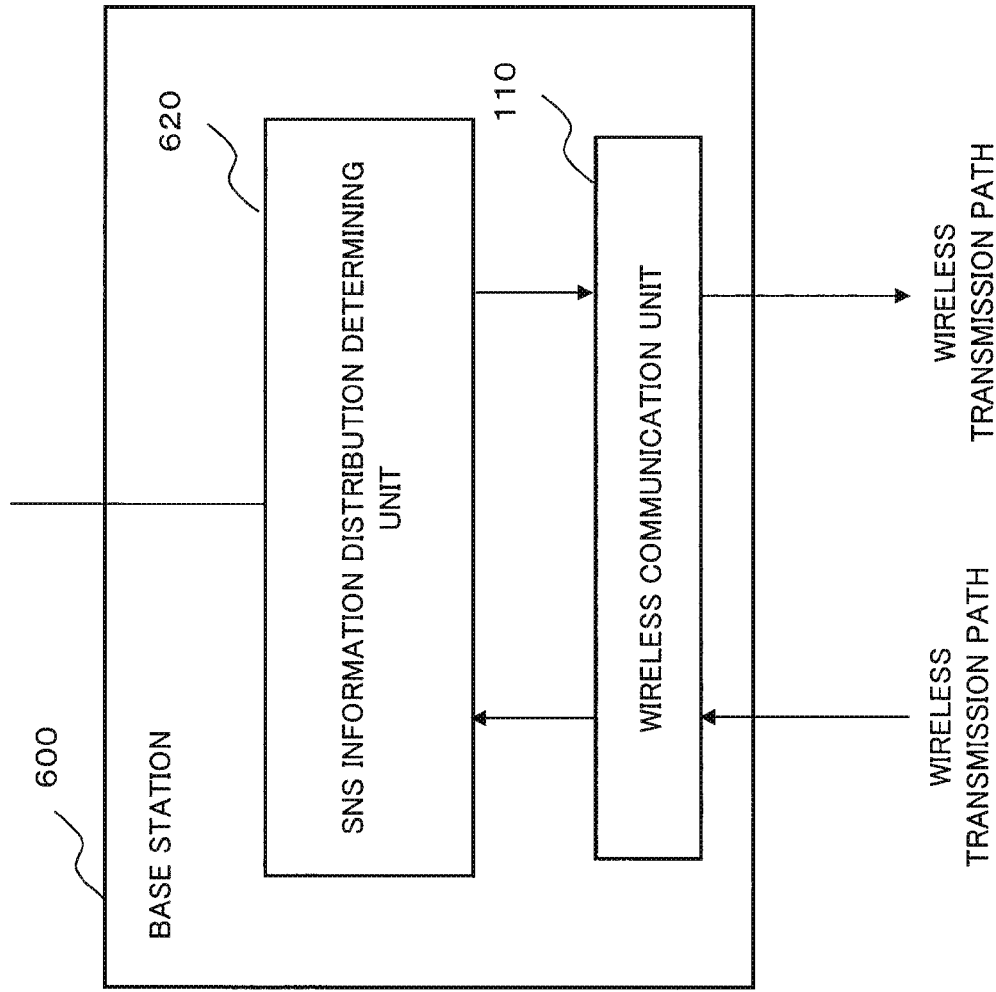
FIG. 12 is a diagram illustrating an example of a configuration of a base station included in the wireless communication system according to the fourth embodiment of the present invention.

FIG. 11 is a diagram illustrating an example of a configuration of a wireless communication system according to the fourth embodiment of the present invention. FIG. 12 is a diagram illustrating an example of a configuration of a base station included in the wireless communication system according to the fourth embodiment of the present invention.

As illustrated in FIG. 11, the wireless communication system according to the fourth embodiment includes a base station 600 instead of the base station 100. Moreover, the wireless communication system according to the fourth embodiment includes a location management node 700, which is connected to the base station 600. As illustrated in FIG. 12, the base station 600 includes a SNS information distribution determining unit 620 instead of the SNS information distribution determining unit 120. The SNS information distribution determining unit 620 is connected to the location management node 700.

The location management node 700 obtains the locating times of respective mobile stations located in the cell under the control of the base station 600, by a known function. Moreover, upon input of a message for checking whether the locating time of a certain mobile station is long or short, the location management node 700 judges whether the locating time of the mobile station is longer than or equal to predetermined time period, and outputs, when the locating time is longer than or equal to the predetermined time period, a message indicating that the locating time is long. When the locating time is shorter than the predetermined time period, the location management node 700 outputs a message indicating that the locating time is not long. The predetermined time period is set in the location management node 700 by a user of the wireless communication system of this embodiment. The user of the wireless communication system of this embodiment may set, as the predetermined time period, the average value of time in which the mobile station 10 stays in the cell of the base station 600 per day.

Moreover, the SNS information distribution determining unit 620 of the base station 600 identifies the mobile station from which received data including a user profile was transmitted, by using a known function, and outputs a message for checking whether the locating time of the mobile station is long or short. When a message indicating that the locating time is not long is input, the SNS information distribution determining unit 620 broadcasts the stored data (data including the user profile) to the mobile stations.

Since the configuration and functions other than those described above are the same as those of the wireless communication system according to the first embodiment, the same numerals are used for the same configuration and functions while description thereof is omitted.

[Description of Operation]

Figure 13:
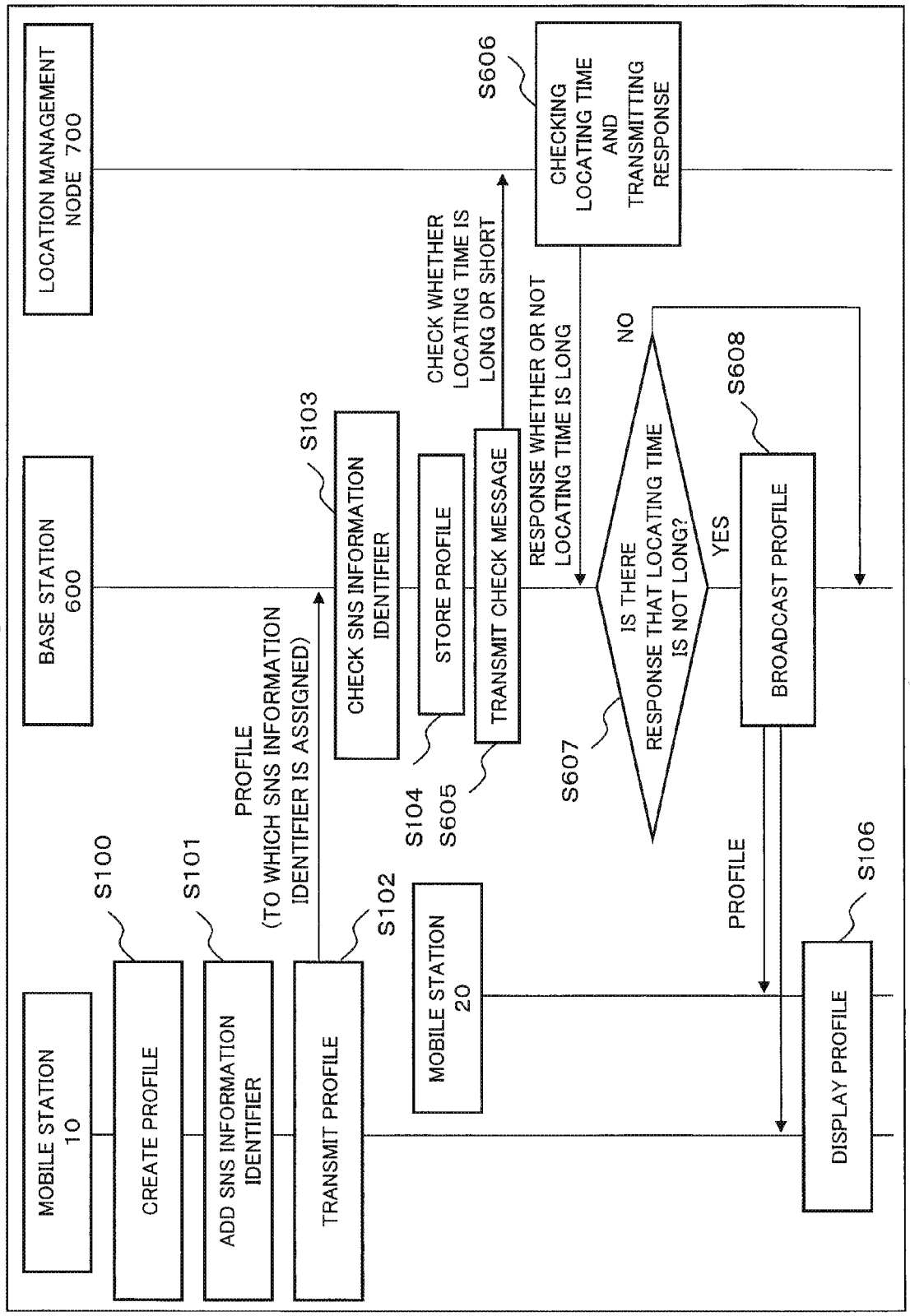
FIG. 13 is a flowchart for illustrating operation of the wireless communication system according to the fourth embodiment of the present invention.

FIG. 13 is a flowchart for illustrating operation of the wireless communication system according to the fourth embodiment of the present invention.

First, the mobile station 10 and the base station 600 perform S100 to S104 described above, and the SNS information distribution determining unit 620 of the base station 600 receives data including a user profile and then stores the data. Moreover, the SNS information distribution determining unit 620 finds that the data including the user profile was data transmitted from the mobile station 10, by using a known function.

Then, the SNS information distribution determining unit 620 outputs, to the location management node 700, a message for checking whether the locating time of the mobile station 10, which transmitted the data including the user profile, is long or short (S605).

Then, upon input of the message for checking whether the locating time of the mobile station 10 is long or short, the location management node 700 checks whether or not the locating time of the mobile station 10 is longer than or equal to the predetermined time. When the locating time of the mobile station 10 is shorter than the predetermined time period, the location management node 700 outputs a message indicating that the locating time is not long, to the SNS information distribution determining unit 620 of the base station 600. When the locating time of the mobile station 10 is longer than or equal to the predetermined time, the location management node 700 outputs a message indicating that the locating time is long, to the SNS information distribution determining unit 620 of the base station 600 (S606).

Then, when the message indicating that the locating time is not long is input by the location management node 700, the base station 600 judges that the mobile station 10 is not located in a private space, and broadcasts the data (data including the user profile) stored in S104 (S608).

Specifically, when the message indicating that the locating time is not long is input, the SNS information distribution determining unit 620 of the base station 600 reads the data stored in S104. Then, the SNS information distribution determining unit 620 removes a SNS information identifier from the read data, creates a broadcast signal including the data after the removal, and outputs the broadcast signal to the wireless communication unit 110. The wireless communication unit 110 broadcasts the broadcast signal to the mobile stations 10, 20, and 30.

By contrast, when the message indicating that the locating time is long is input, the SNS information distribution determining unit 620 of the base station 600 judges that the mobile station is in a private space, and does not output the data stored in S104 to the wireless communication unit 110. In other words, the base station 600 does not broadcast the data stored in S104 to the mobile stations 10, 20, and 30.

[Description of Effects]

According to this embodiment, when the mobile station is located in a private space such as home, the wireless communication system can prevent mistaken broadcasting of SNS data related to private matters.

The reason is that the SNS information distribution determining unit 620 checks the locating time of the mobile station 10, which transmitted the SNS data, judges, when the mobile station 10 has been located in the cell of the base station 600 for a time period longer than or equal to the predetermined time period, that the mobile station 10 is in a private space, and hence does not broadcast the SNS data.

Fifth Embodiment

Next, a fifth embodiment of the present invention will be described.

[Description of Configuration]

Figure 14:
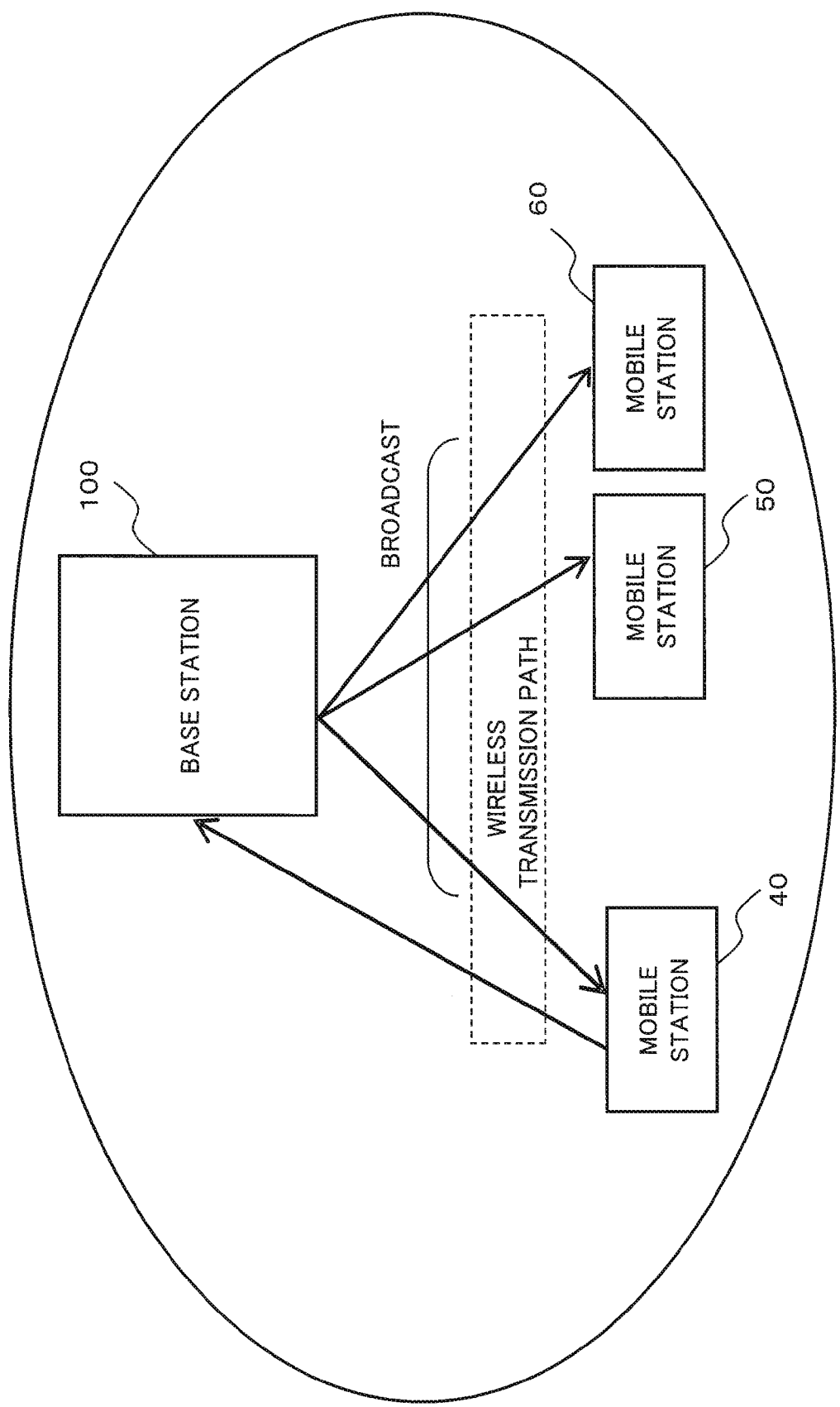
FIG. 14 is a diagram illustrating an example of a configuration of a wireless communication system according to a fifth embodiment of the present invention.
Figure 15:
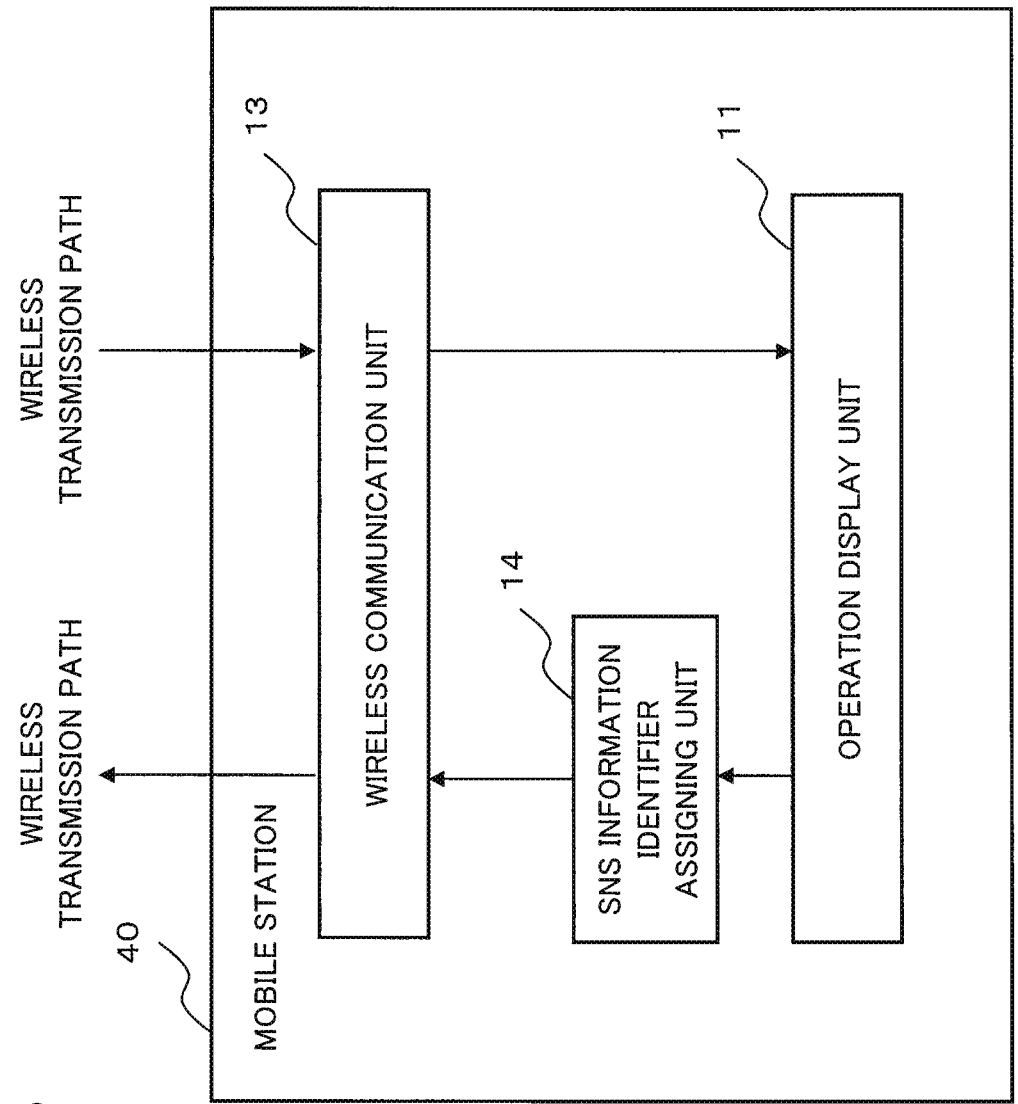
FIG. 15 is a diagram illustrating an example of a configuration of a mobile station included in the wireless communication system according to the fifth embodiment of the present invention.

FIG. 14 is a diagram illustrating an example of a configuration of the wireless communication system according to the fifth embodiment of the present invention. FIG. 15 is a diagram illustrating an example of a configuration of a mobile station included in the wireless communication system according to the fifth embodiment of the present invention.

As illustrated in FIG. 14, the wireless communication system according to the fifth embodiment includes mobile stations 40, 50, and 60 instead of the mobile stations 10, 20, and 30. The mobile stations 40, 50, and 60 have the same configuration and functions, and include a SNS information identifier assigning unit 14 instead of the SNS information identifier assigning unit 12, as illustrated in FIG. 15.

The SNS information identifier assigning unit 14 of each of the mobile stations 40, 50, and 60 checks that the mobile station is located in the cell under the control of the base station 100, by using a known function, and measures the locating time. For example, the SNS information identifier assigning unit 14 may detect the cell ID of the base station 100, by using a known function, and measure, as the locating time, the time period in which the cell ID is being detected. Upon input of layer-3 data, the SNS information identifier assigning unit 14 checks whether the locating time is shorter than or equal to a predetermined time period. When the locating time is shorter than or equal to the predetermined time period, the SNS information identifier assigning unit 14 assigns a SNS information identifier to the input layer-3 data. The predetermined time period is set in the SNS information identifier assigning unit 14 by a user of the wireless communication system of this embodiment. The predetermined time period may be the average value of the time period in which the mobile station 40 stays in the cell under the control of the base station 100 per day.

Since the configuration and functions other than those described above are the same as those of the wireless communication system according to the first embodiment, the same numerals are used for the same configuration and functions while description thereof is omitted.

[Description of Operation]

Figure 16:
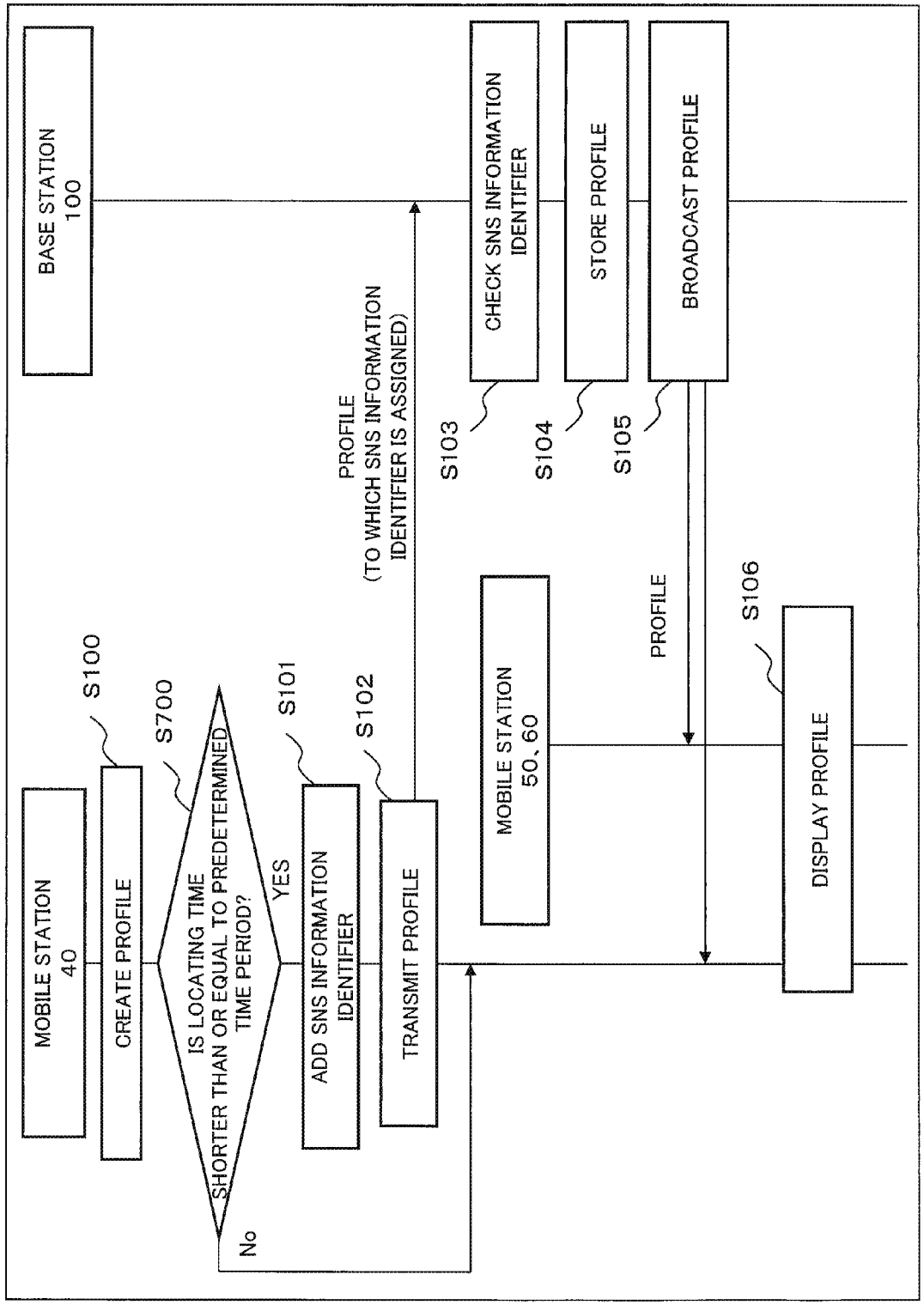
FIG. 16 is a flowchart for illustrating operation of the wireless communication system according to the fifth embodiment of the present invention.

FIG. 16 is a flowchart for illustrating operation of the wireless communication system according to the fifth embodiment of the present invention.

First, the SNS information identifier assigning unit 14 of the mobile station 40 performs S100 described above, and checks, upon input of layer-3 data from the operation display unit 11, whether the locating time in which the mobile station 40 is located in the cell under the control of the base station 100 is shorter than or equal to the predetermined time period (S700).

In this example, it is assumed that the SNS information identifier assigning unit 14 checks that the mobile station 40 is located in the cell under the control of the base station 100, by using a known function, and measures the locating time.

Then, when the locating time is shorter than or equal to the predetermined time period, the SNS information identifier assigning unit 14 performs S101 described above, to assign a SNS information identifier to the input layer-3 data. Further, the SNS information identifier assigning unit 14 performs S102 described above to add the layer-3 data to which the SNS information identifier is assigned, to a known RRC message and then transmit the RRC message to the base station 100.

When the locating time is longer than the predetermined time period, the SNS information identifier assigning unit 14 judges that the mobile station 40 is in a private space such as home, and performs neither S101 nor S102 described above and hence does not transmit any message to the base station 100.

[Description of Effects]

According to this embodiment, when the mobile station is in a private space such as home, the wireless communication system can prevent mistaken broadcasting of SNS data related to private matters from the mobile station.

The reason is that the SNS information identifier assigning unit 14 checks the time period in which the mobile station 40 has been located in the cell of the base station 100, judges, when the time period is longer than the predetermined time period, that the mobile station 40 is in a private space, and does not transmit the SNS data to the base station.

Sixth Embodiment

Next, a sixth embodiment of the present invention will be described.

A wireless communication system according to the sixth embodiment is to distribute SNS data to a mobile station that performs a handover. The wireless communication system according to the sixth embodiment uses MBMS (Multimedia Broadcast and Multicast Service) multicast mode for distributing SNS data to a mobile station that performs a handover. MBMS multicast mode is a technique for multicasting data to a particular mobile station. In the following, description will be given of a configuration and operation of the wireless communication system according to the sixth embodiment.

[Description of Configuration]

Figure 17:
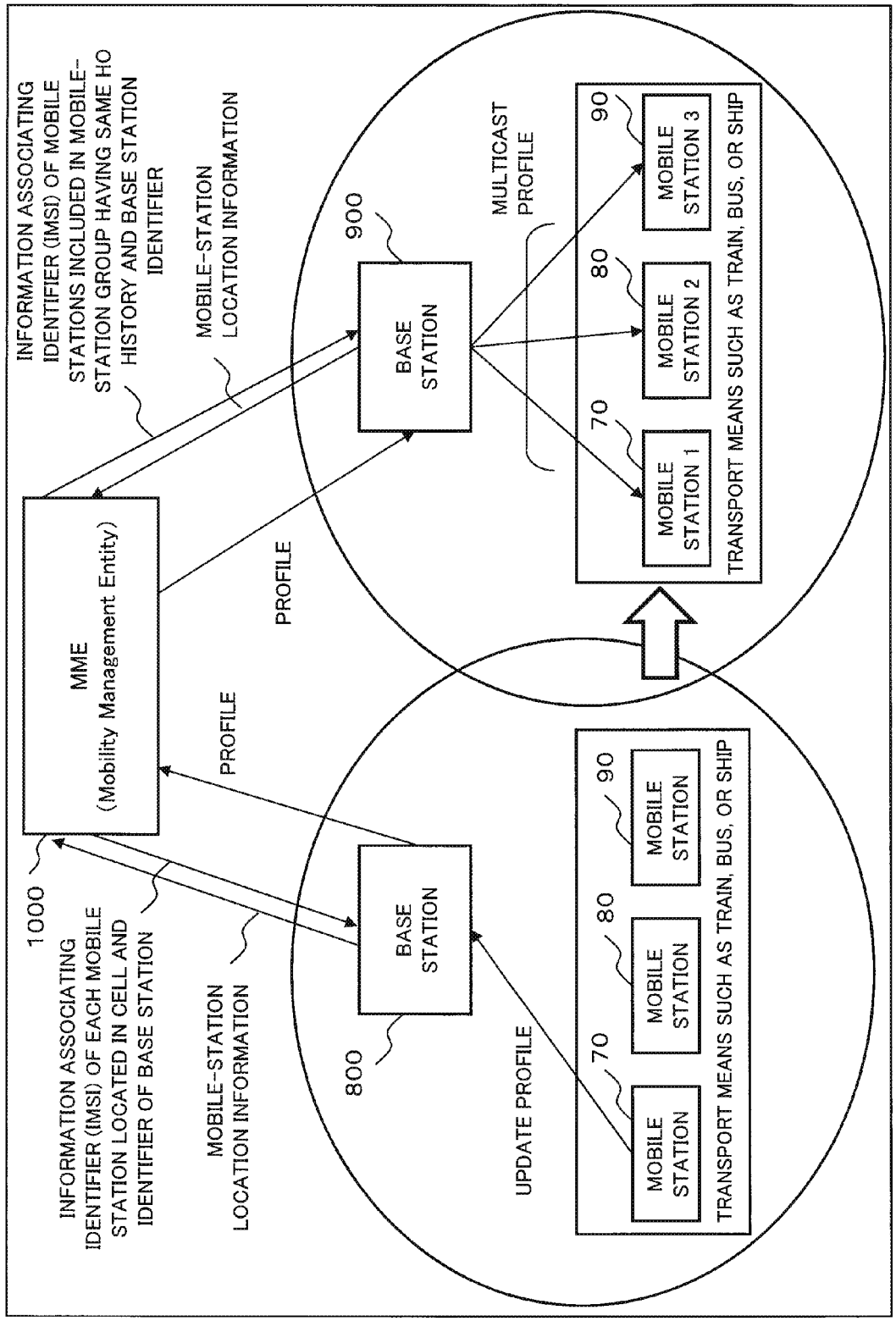
FIG. 17 is a diagram illustrating an example of a configuration of a wireless communication system according to a sixth embodiment of the present invention.
Figure 18:
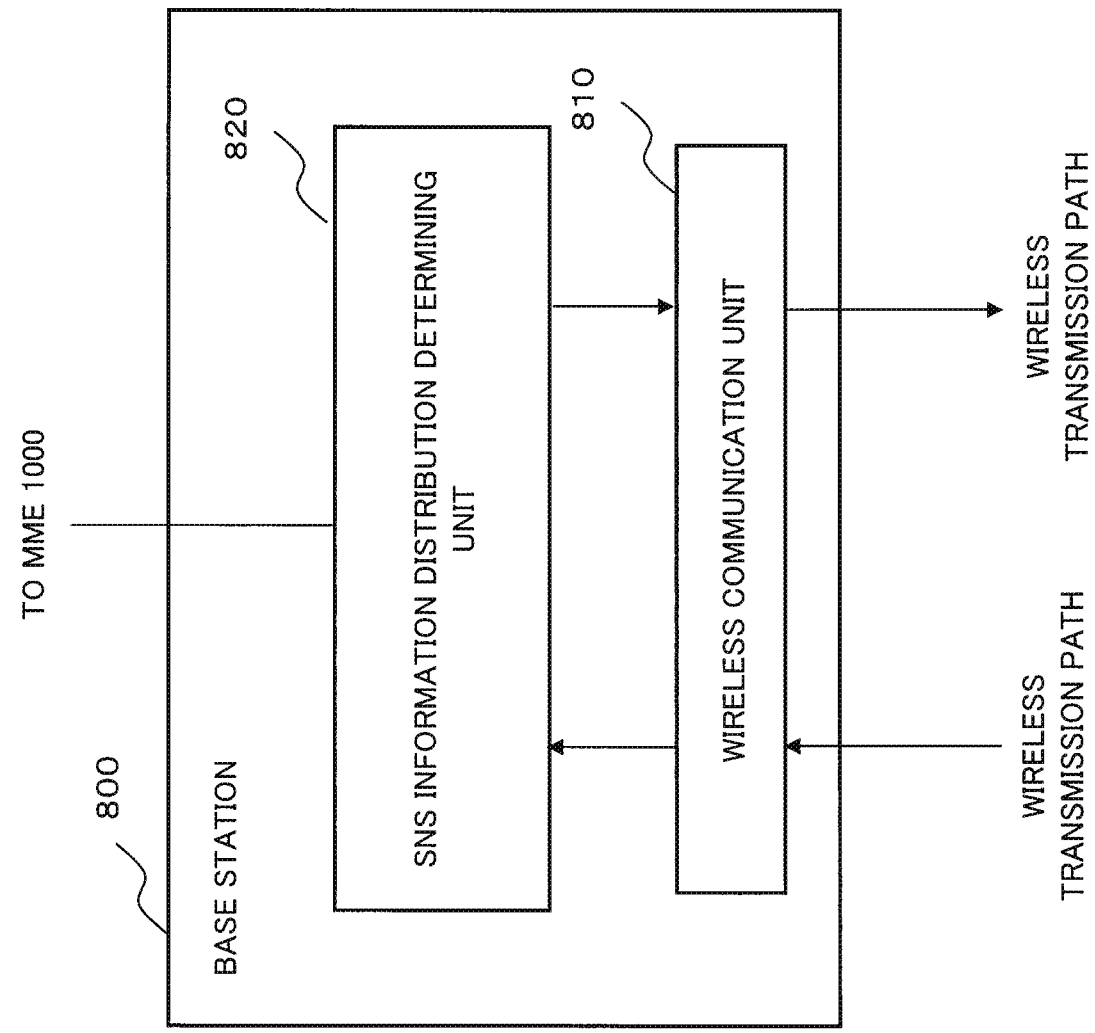
FIG. 18 is a diagram illustrating an example of a configuration of a base station included in the wireless communication system according to the sixth embodiment of the present invention.
Figure 19:
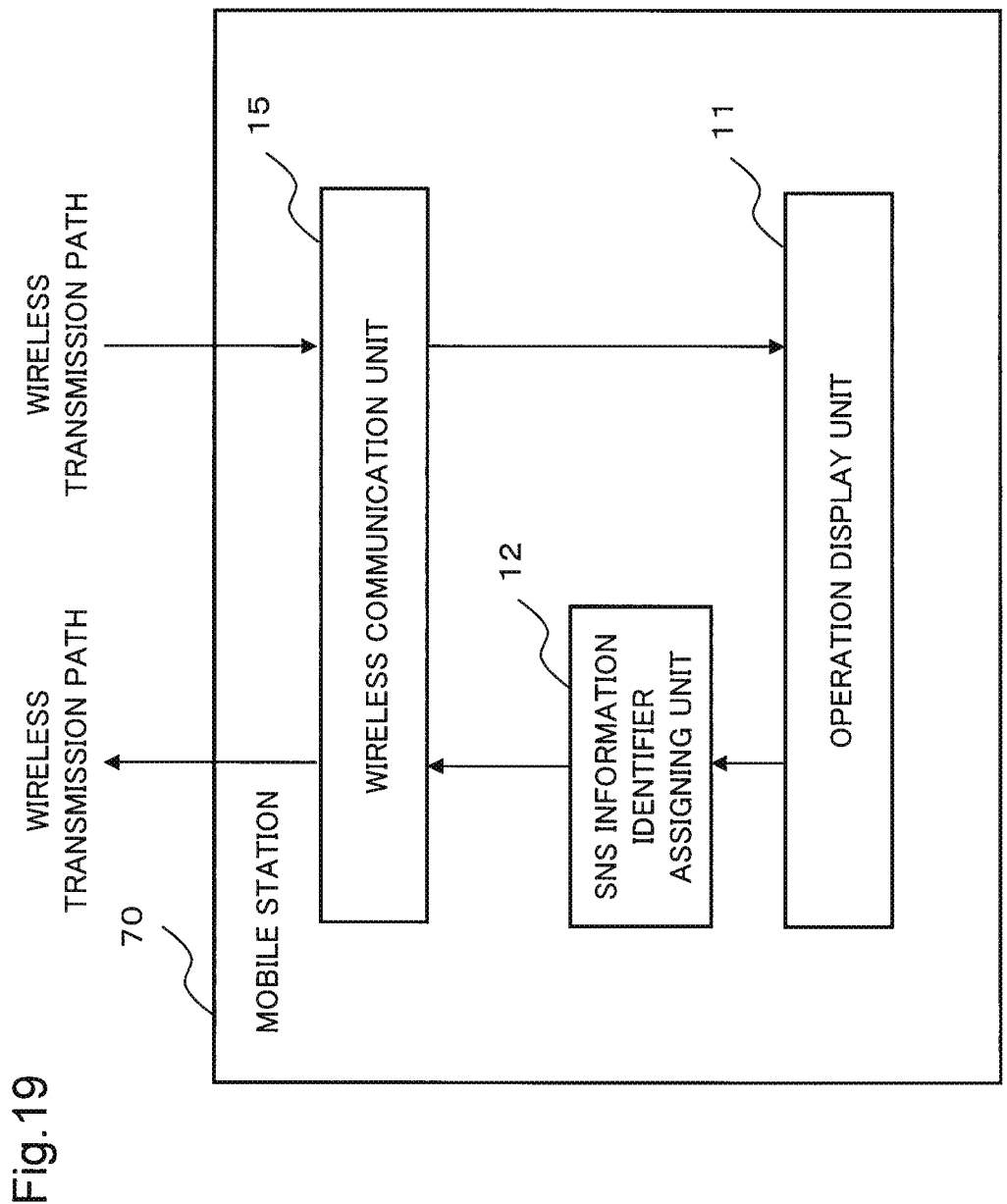
FIG. 19 is a diagram illustrating an example of a configuration of a mobile station included in the wireless communication system according to the sixth embodiment of the present invention.

FIG. 17 is a diagram illustrating an example of a configuration of the wireless communication system according to the sixth embodiment of the present invention. FIG. 18 is a diagram illustrating an example of a configuration of a base station included in the wireless communication system according to the sixth embodiment of the present invention. Moreover, FIG. 19 is a diagram illustrating an example of a configuration of a mobile station included in the wireless communication system according to the sixth embodiment of the present invention.

As illustrated in FIG. 17, the wireless communication system according to the sixth embodiment includes a base station 800 and a base station 900 instead of the base station 100. In addition, the wireless communication system according to the sixth embodiment includes mobile stations 70, 80, and 90 instead of the mobile stations 10, 20, and 30. The mobile stations 70, 80, and 90 move by a transport means such as a train, a bus, or a ship, and each performs a handover between cells of the base station 800 and the base station 900. Moreover, the wireless communication system according to the sixth embodiment includes an MME (Mobility Management Entity) 1000. The MME 1000 is connected to the base station 800 and the base station 900 via wired lines. In addition, each of the mobile stations 70, 80, and 90 is connected to a corresponding one of the base station 800 and the base station 900 via a wireless transmission path.

The base stations 800 and 900 have the same configuration and functions, and include a wireless communication unit 810 and a SNS information distribution determining unit 820 instead of the wireless communication unit 110 and the SNS information distribution determining unit 120, as illustrated in FIG. 18. The SNS information distribution determining unit 820 is connected to the MME 1000. Moreover, the mobile stations 70, 80, and 90 have the same configuration and functions, and include a wireless communication unit 15 instead of the wireless communication unit 13, as illustrated in FIG. 19.

The MME 1000 identifies the cell of the base station in which each of the mobile stations 70, 80, and 90 is located, by using a known function, and stores the information related to the cell as location information. The location information is information associated, for the identification number indicating each of the mobile stations 70, 80, and 90, with the identifier indicating the base station of the cell in which the mobile station 70, 80, and 90 is located. The identification number indicating each of the mobile stations 70, 80, and 90 may be an IMSI (International Mobile Subscriber Identity). Alternatively, the identifier indicating the base station of the cell in which the mobile stations 70, 80, and 90 are located may be an M-TMSI (M-Temporary Mobile Subscriber Identity). After storing location information, the MME 1000 outputs the location information.

Moreover, the MME 1000 identifies the mobile station that is performing a handover, by a known function. Further, the MME 1000 also identifies the base station from which the mobile station is performing the handover (referred to as a "handover-source base station" below) and the base station to which the mobile station is performing the handover (referred to as a "handover-destination base station" below), by using a known function. Every time a mobile station performs a handover, the MME 1000 associates the time of the handover, the IMSI of the mobile station performing the handover, the identifier indicating the handover-source base station, and the identifier of the handover-destination base station with one another, and stores the information as a handover history. FIG. 20 is an example of handover history used in the wireless communication system according to the sixth embodiment of the present invention.

Moreover, upon input of data including a user profile and the identification number IMSI indicating a mobile station, the MME 1000 checks whether the mobile station indicated by the input IMSI (referred to as a "profile transmitting mobile station" below) is performing a handover on the basis of the handover history. Specifically, the MME 1000 checks the above-described handover history, and judges, when the input IMSI is included immediately nearby, that the profile transmitting mobile station is performing a handover. It is assumed that the time period corresponding to being immediately nearby is a time period from the current time to the time that is a predetermined time period before the current time. The predetermined time period is set in the MME 1000 by a user of the wireless communication system of this embodiment. When determining that the profile transmitting mobile station is performing a handover, the MME 1000 identifies the handover-source base station and the handover-destination base station of the profile transmitting mobile station. In addition, when the profile transmitting mobile station is performing a handover, the MME 1000 detects other mobile stations performing the same handover as that of the profile transmitting mobile station, from the handover history. In other words, the MME 1000 detects each mobile station that has performed a handover immediately nearby and has the same handover-source base station and handover-destination mobile station as those of the profile transmitting mobile station. For example, assume in FIG. 20 that the mobile station having the IMSI of xxxxxxxxxxxxxx2 is a profile transmitting mobile station. In this case, the mobile stations having the IMSIs of xxxxxxxxxxxxxx3, 4 have performed a handover immediately nearby, and have the same handover-source base station and handover-destination base station as those of the profile transmitting mobile station. Hence, the MME 1000 detects the mobile stations having the IMSIs of xxxxxxxxxxxxxx3, 4 as mobile stations performing the same handover as that of the profile transmitting mobile station. The MME 1000 stores the IMSIs of the detected mobile stations and the profile transmitting mobile station as a mobile-station group.

Moreover, the MME 1000 checks whether each of the mobile stations in the mobile-station group is located in the cell of the handover-destination base station, from the above-described location information. When the mobile-station group is located in the cell of the handover-destination base station, the MME 1000 establishes a connection for providing an MBMS service, i.e., a radio bearer, with each of the mobile stations of the mobile-station group via the handover-destination base station by using a known function. In addition, when the mobile-station group is located in the cell of the handover-destination base station, the MME 1000 outputs the IMSIs indicating the mobile stations of the mobile-station group, the identifier indicating the handover-destination base station, and data including the user profile.

The SNS information distribution determining unit 820 of each of the base stations 800 and 900 identifies the mobile station that transmitted the stored data including the user profile, by using a known function, and obtains the IMSI of the mobile station from the input location information. The SNS information distribution determining unit 820 associates with each other and outputs the data including the user profile and the IMSI of the mobile station that transmitted the data. Moreover, the SNS information distribution determining unit 820 outputs the input data including the user profile by including the data in an MBMS data transmission channel (referred to as an "MTCH" below).

The wireless communication unit 810 of each of the base stations 800 and 900 performs a known layer-1,2 transmission process specified by the 3GPP (e.g., encoding, modulation, or the like) on the input MTCH, and performs multicast to the mobile stations of the mobile-station group on the established radio bearer.

Since the configuration and functions other than those described above are the same as those of the wireless communication system according to the first embodiment, the same numerals are used for the same configuration and functions while description thereof is omitted.

Note that the wireless communication system according to the sixth embodiment of the present invention may be configured so that a server or a different device (referred to as a "profile management node" below) would have the above-described functions instead of the configuration that the MME 1000 has the above-described functions.

[Description of Operation]

FIG. 21 is a flowchart illustrating operation of the wireless communication system according to the sixth embodiment of the present invention.

First, the MME 1000 identifies the cell of the base station in which each of the mobile stations 70, 80, and 90 is located, by using a known function, and stores the information related to the cell as the above-described location information.

FIG. 21 presents an example of operation of the MME 1000 for storing the location information at the time of location registration. In other words, in FIG. 21, each of the mobile stations 70, 80, and 90 notifies, at the time of location registration, the base station 800 of the cell in which the mobile station is located, of a message for requesting location registration (S800). Then, upon receipt of the message for requesting location registration, the base station 800 notifies the MME 1000 of the identifier indicating the base station and the identification numbers IMSIs of the mobile stations 70, 80, and 90 (S801). The MME 1000 stores, for each the identification number IMSI of the mobile stations 70, 80, and 90, the identifier indicating the base station 800 as location information (S802).

The MME 1000 notifies the SNS information distribution determining unit 820 of each of the base stations 800 and 900, of the stored location information, although not illustrated in FIG. 21. When the base station of the cell in which each of the mobile stations 70, 80, and 90 is located changes due to a handover or the like, the MME 1000 updates the location information by using a known function, and notifies, every time the location information is updated, the SNS information distribution determining unit 820 of the location information. The SNS information distribution determining unit 820 of each of the base stations 800 and 900 stores the location information notified by the MME 1000.

Then, when the mobile station 70 and the base station 800 perform S100 to S104 described above, the SNS information distribution determining unit 820 of the base station 800 identifies the mobile station 70 as the mobile station that transmitted the received data including the user profile, by using a known function, although not illustrated in FIG. 21. Then, the SNS information distribution determining unit 820 associates with each other and outputs, to the MME 1000, the received data including the user profile and the IMSI of the mobile station 70, which transmitted the data, i.e., the profile transmitting mobile station (S803).

Upon input of the data including the user profile and the IMSI of the profile transmitting mobile station by the SNS information distribution determining unit 820 of the base station 800, the MME 1000 judges whether the profile transmitting mobile station is performing a handover, on the basis of the above-described handover history (S804).

Specifically, the MME 1000 checks the handover history, and judges, when the input IMSI of the profile transmitting mobile station (mobile station 70) is immediately nearby, that the profile transmitting mobile station is performing a handover. When the profile transmitting mobile station is performing a handover, the MME 1000 identifies the handover-source base station and the handover-destination base station of the profile transmitting mobile station, from the handover history on the basis of the IMSI of the profile transmitting mobile station.

Then, when the profile transmitting mobile station is performing a handover, the MME 1000 detects mobile stations performing the same handover as that of the profile transmitting mobile station from the handover history, and stores the IMSIs of detected mobile stations and the profile transmitting mobile station (S805).

Specifically, the MME 1000 detects, from the handover history, each mobile station that has performed a handover immediately nearby and that has the same handover-source base station and the handover-destination base station as those of the profile transmitting mobile station, and stores the IMSIs of the detected mobile stations and the profile transmitting mobile station as a mobile-station group. In this example, description will be further given by assuming that the mobile stations 80 and 90 are detected as the mobile stations that are performing the same handover as that of the profile transmitting mobile station.

Then, the MME 1000 checks whether each of the mobile stations 70, 80, and 90 of the mobile-station group is located in the cell of the handover-destination base station, on the basis of the above-described location information. In this example, description will be further given by assuming that the handover-destination base station is the base station 900.

Then, when the mobile stations 70, 80, and 90 are located in the cell of the handover-destination base station 900, the MME 1000 outputs the data including the user profile and a mobile-station list to the SNS information distribution determining unit 820 of the base station 900 (S806).

The above-mentioned mobile-station list is a list in which the IMSI of each of the mobile stations in the mobile-station group is associated with the identifier indicating the handover-destination base station.

Then, the MME 1000 establishes a connection for providing an MBMS service, i.e., a radio bearer, with each of the mobile stations by a known function (S807).

Specifically, the MME 1000 notifies the mobile stations 70, 80, and 90 of the mobile-station group, that provision of the MBMS service is to be started, via a known notification message. In response to the notification message, each of the mobile stations 70, 80, and 90 of the mobile-station group transmits a known response message to the MME 1000. Thereafter, the MME 1000 transmits information on the radio bearer to each of the mobile stations of the mobile-station group via an MBMS control channel, and each of the mobile stations establishes the radio bearer with the MME 1000 by setting the notified information.

Then, the base station 900 multicasts the data including the user profile and input by the MME 1000, to the mobile stations 70, 80, and 90 in the mobile-station list, by using an MBMS data transmission channel (referred to as an "MTCH" below) (S808).

Specifically, the SNS information distribution determining unit 820 of the base station 900 removes the SNS information identifier from the data including the user profile and input by the MME 1000, creates an MTCH including the data after the removal, and outputs the MTCH to the wireless communication unit 810. Moreover, the wireless communication unit 810 performs a known transmission process (such as encoding, modulation, or the like) on the MTCH input by the SNS information distribution determining unit 820, and performs multicast to each of the mobile stations 70, 80, and 90 of the mobile group on the established radio bearer.

Then, each of the mobile stations 70, 80, and 90 receives the MTCH, extracts the user profile by using a known technique, and displays the user profile on the display screen of the mobile station (S809).

Specifically, the wireless communication unit 15 of each of the mobile stations 70, 80, and 90 receives the MTCH, performs a known layer-1,2 reception process specified by the 3GPP (e.g., demodulation, decoding, or the like), and thereby extracts layer-3 data included at a predetermined position of the received signal. Then, the operation display unit 11 of each of the mobile stations 70, 80, and 90 converts the layer-3 data input by the wireless communication unit 15, back to the user profile by using a known technique, and displays the user profile on the display screen.

[Description of Effects]

According to this embodiment, the wireless communication system can distribute SNS data to multiple mobile stations moving on a train or the like between cells of adjacent base stations.

The reason is that the MME 1000 detects mobile stations having the same handover history, as mobile stations moving by a train or the like between the cells, and the handover-destination base station distributes the SNS data to the detected mobile stations in the MBMS multicast mode.

Seventh Embodiment

Next, a seventh embodiment of the present invention will be described.

[Description of Configuration]

Figure 22:
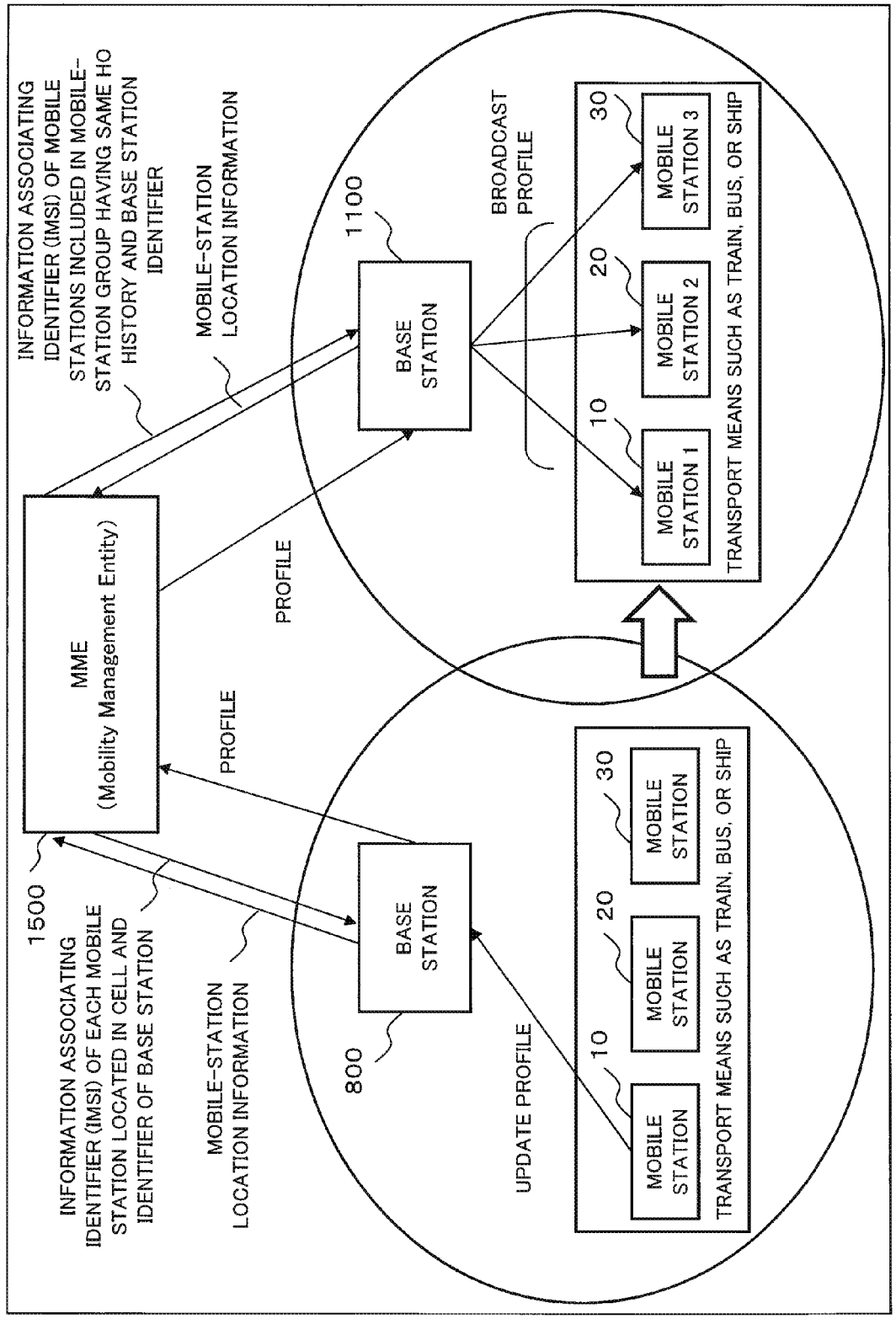
FIG. 22 is a diagram illustrating an example of a configuration of a wireless communication system according to a seventh embodiment of the present invention.
Figure 23:
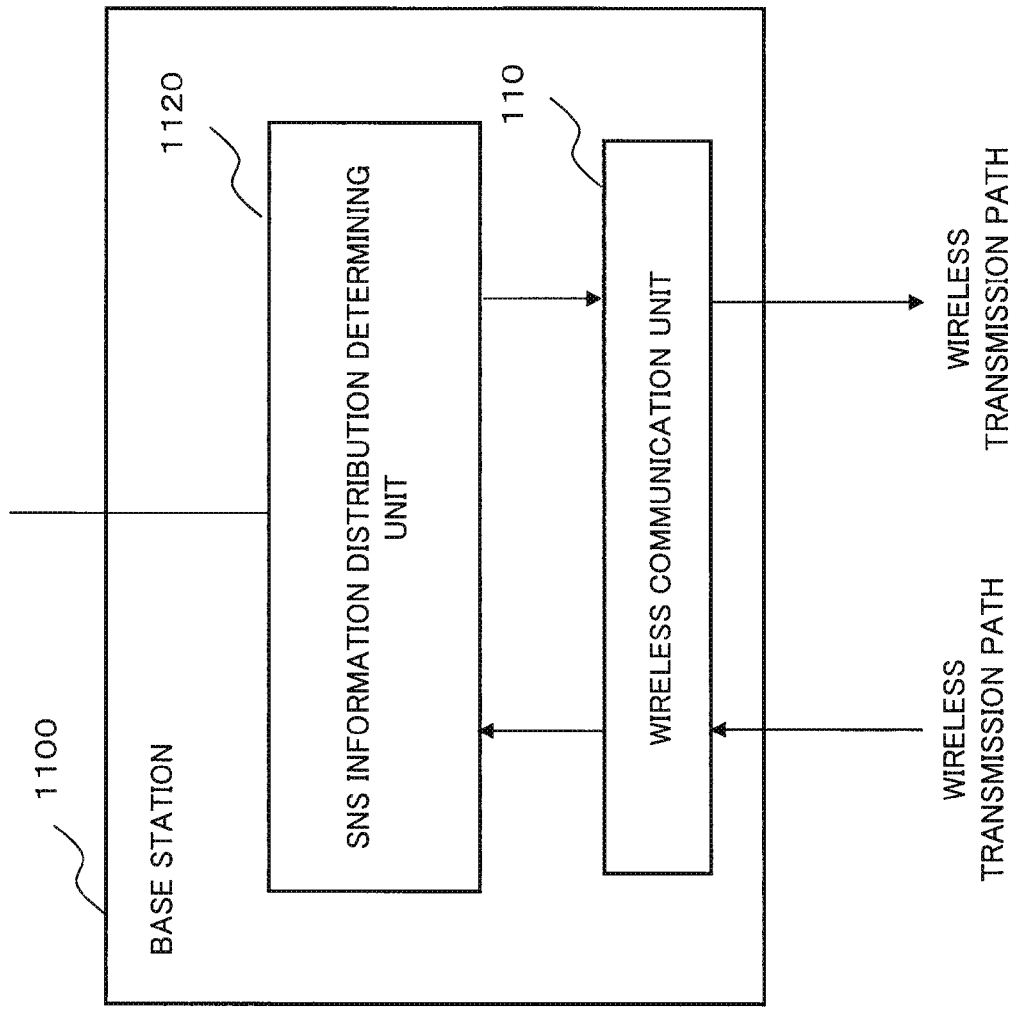
FIG. 23 is a diagram illustrating an example of a configuration of a base station included in the wireless communication system according to the seventh embodiment of the present invention.

FIG. 22 is a diagram illustrating an example of a configuration of a wireless communication system according to a seventh embodiment of the present invention. FIG. 23 is a diagram illustrating an example of a configuration of a base station included in the wireless communication system according to the seventh embodiment of the present invention.

As illustrated in FIG. 22, the wireless communication system of the seventh embodiment includes a base station 1100 instead of the base station 900, unlike the wireless communication system according to the sixth embodiment. Moreover, the wireless communication system according to the seventh embodiment includes an MME 1500 instead of the MME 1000, unlike the wireless communication system according to the sixth embodiment. Further, the wireless communication system according to the seventh embodiment includes the mobile stations 10, 20, and 30 of the wireless communication system according to the first embodiment, unlike the wireless communication system according to the sixth embodiment. Each of the mobile stations 10, 20, and 30 performs a handover between the cells of the base station 800 and the base station 1100 by moving by a transport means such as a train, a bus, or a ship. The MME 1500 is connected to the base station 1100 via a wired line. Moreover, the base station 1100 is wirelessly connected to each of the mobile stations 10, 20, and 30.

Further, as illustrated in FIG. 23, the base station 1100 of the wireless communication system according to the seventh embodiment includes the wireless communication unit 110 and a SNS information distribution determining unit 1120. The wireless communication system 110 is the same wireless communication unit as the wireless communication unit 110 of the wireless communication system according to the first embodiment. The SNS information distribution determining unit 1120 is connected to the MME 1500.

When the mobile stations 10, 20, and 30 of a mobile-station group are located in the cell of the handover-destination base station 1100, the MME 1500 outputs data including a user profile.

Upon input of the data including the user profile, the SNS information distribution determining unit 1120 of the base station 1100 removes the SNS information identifier from the data, and creates and outputs a broadcast signal including the data after the removal.

Since the configuration and functions other than those described above are the same as those of the wireless communication system according to the sixth embodiment, the same numerals are used for the same configuration and functions while description thereof is omitted.

[Description of Operation]

Figure 24:
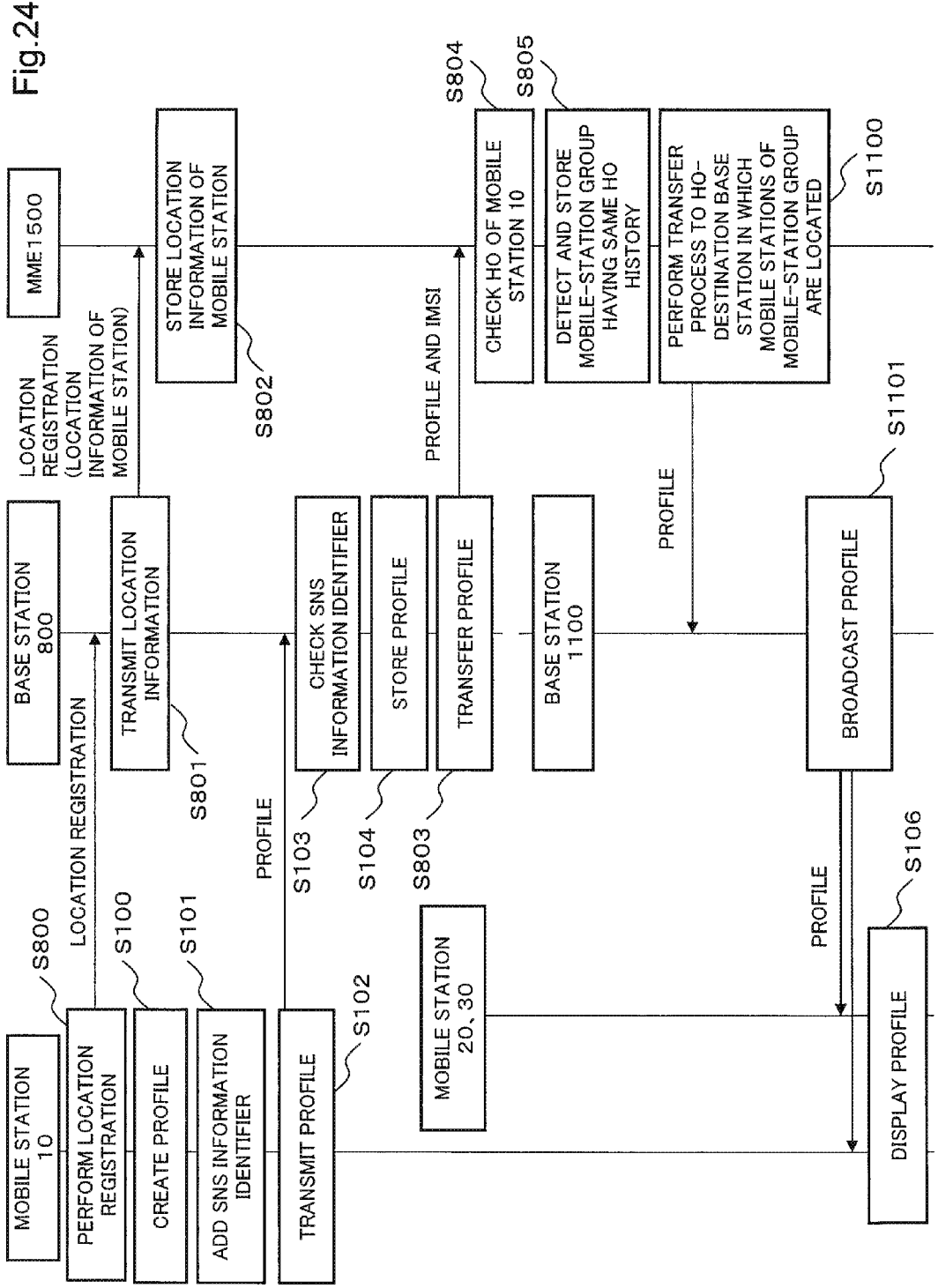
FIG. 24 is a flowchart for illustrating operation of the wireless communication system according to the seventh embodiment of the present invention.

FIG. 24 is a flowchart for illustrating operation of the wireless communication system according to the seventh embodiment of the present invention.

The MME 1500 performs S804 and S805 described above, and thereby checks whether each of the mobile stations 10, 20, and 30 of the mobile-station group is located in the cell of the handover-destination base station 1100, from the location information. Then, when each of the mobile stations 10, 20, and 30 of the mobile-station group is located in the cell of the handover-destination base station 1100, the MME 1500 outputs the data including the user profile to the SNS information distribution determining unit 1120 of the handover-destination base station 1100 (S1100).

Upon input of the data including the user profile by the MME 1500, the base station 1100 removes the SNS information identifier from the data, creates a broadcast signal including the data after the removal, and broadcasts the broadcast signal to the mobile stations 10, 20, and 30 (S1101).

Specifically, the SNS information distribution determining unit 1120 of the base station 1100 removes the SNS information identifier from the data including the user profile input by the MME 1500, creates a broadcast signal including the data after the removal, and then outputs the broadcast signal to the wireless communication unit 110.

[Description of Effects]

According to this embodiment, the wireless communication system can distribute SNS data to multiple mobile stations moving between cells of adjacent base stations by a train or the like.

The reason is that the MME 1000 detects mobile stations having the same handover history as mobile stations moving between cells by a train or the like, and the handover-destination base station distributes SNS data to the detected mobile stations to the cell under the control of the base station.

Eighth Embodiment

Next, an eighth embodiment of the present invention will be described.

[Description of Configuration]

Figure 25:
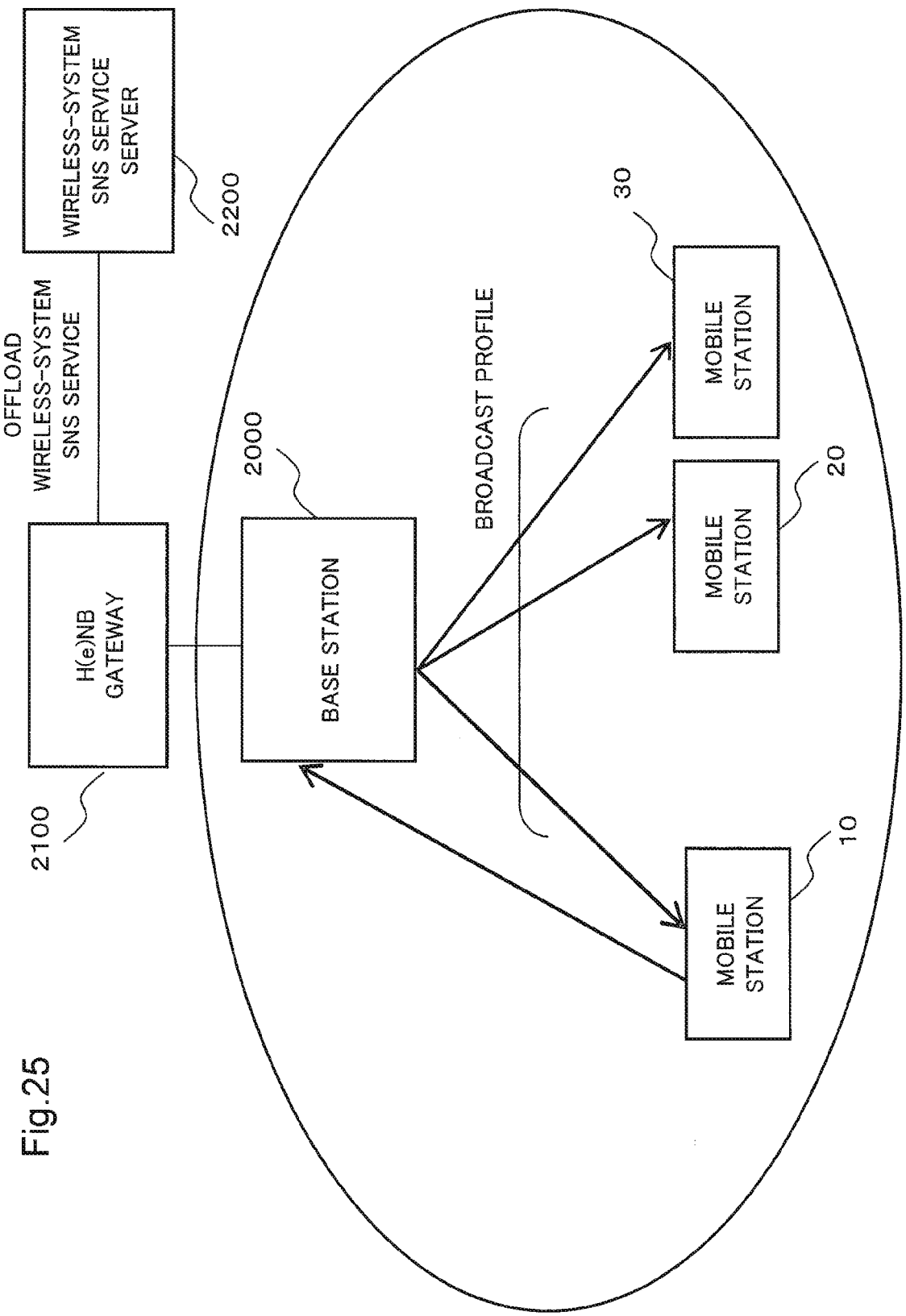
FIG. 25 is a diagram illustrating an example of a configuration of a wireless communication system according to an eighth embodiment of the present invention.
Figure 26:
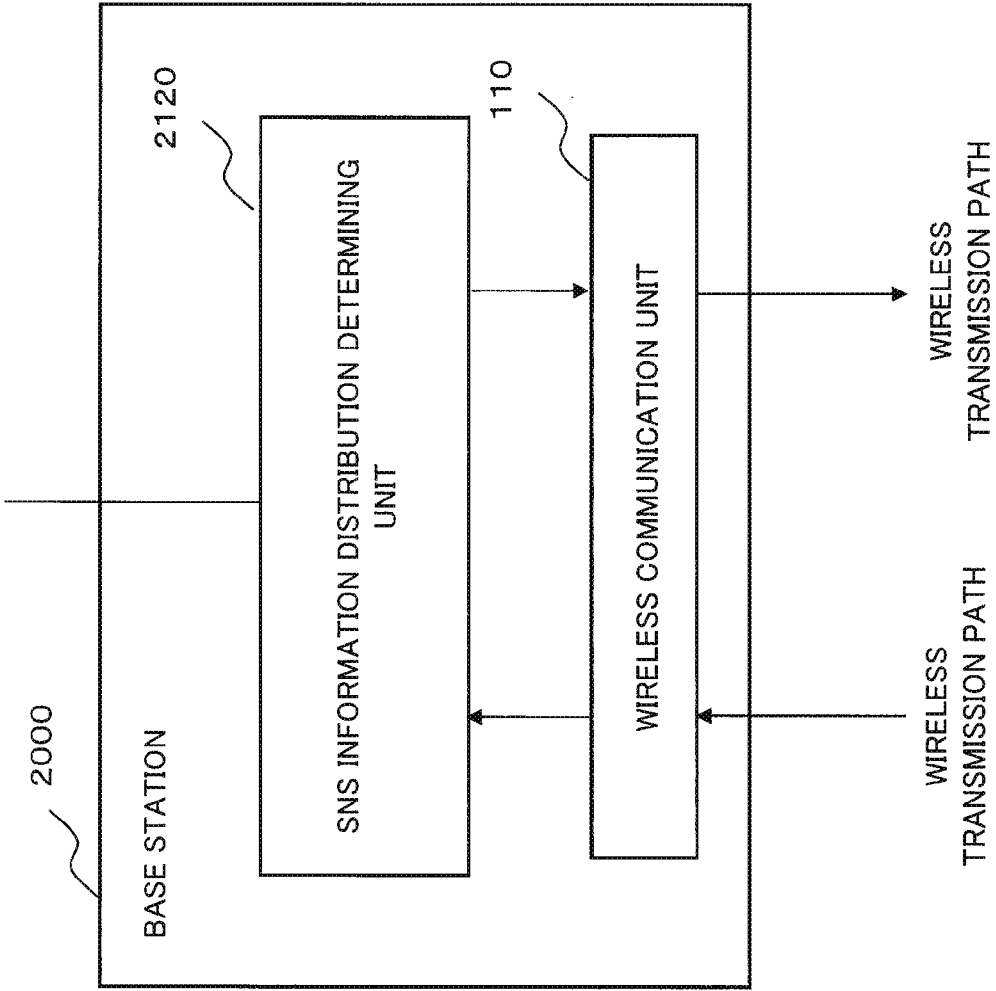
FIG. 26 is a diagram illustrating an example of a configuration of a base station included in the wireless communication system according to the eighth embodiment of the present invention.

FIG. 25 is a diagram illustrating an example of a configuration of a wireless communication system according to the eighth embodiment of the present invention. FIG. 26 is a diagram illustrating an example of a configuration of a base station included in the wireless communication system according to the eighth embodiment of the present invention.

As illustrated in FIG. 25, the wireless communication system according to the eighth embodiment includes a base station 2000 instead of the base station 100, unlike the wireless communication system according to the first embodiment. The wireless communication system according to the eighth embodiment also includes an H(e)NB Gateway (Home (e)NodeB Gateway) 2100 and a SNS service server 2200, unlike the wireless communication system according to the first embodiment.

The base station 2000 is an H(e)NB(Home(e) NodeB). The base station 2000 is connected to the H(e)NB Gateway 2100 via a wired line, and the H(e)NB Gateway 2100 is connected to the SNS service server 2200 via a wired line.

Moreover, as illustrated in FIG. 26, the base station 2000 of the wireless communication system according to the eighth embodiment includes a SNS information distribution determining unit 2120 instead of the SNS information distribution determining unit 120. The SNS information distribution determining unit 2120 is connected to the H(e)NB Gateway 2100.

The SNS information distribution determining unit 2120 of the base station 2000 outputs stored data including a user profile. The SNS information distribution determining unit 2120 removes the SNS information identifier from the input data including the user profile, and creates a broadcast signal including the data after the removal.

The H(e)NB Gateway 2100 outputs the input data including the user profile.

The SNS service server 2200 stores and then outputs the input data including the user profile.

Since the configuration and functions other than those described above are the same as those of the wireless communication system according to the first embodiment, the same numerals are used for the same configuration and functions while description thereof is omitted.

[Description of Operation]

Figure 27:
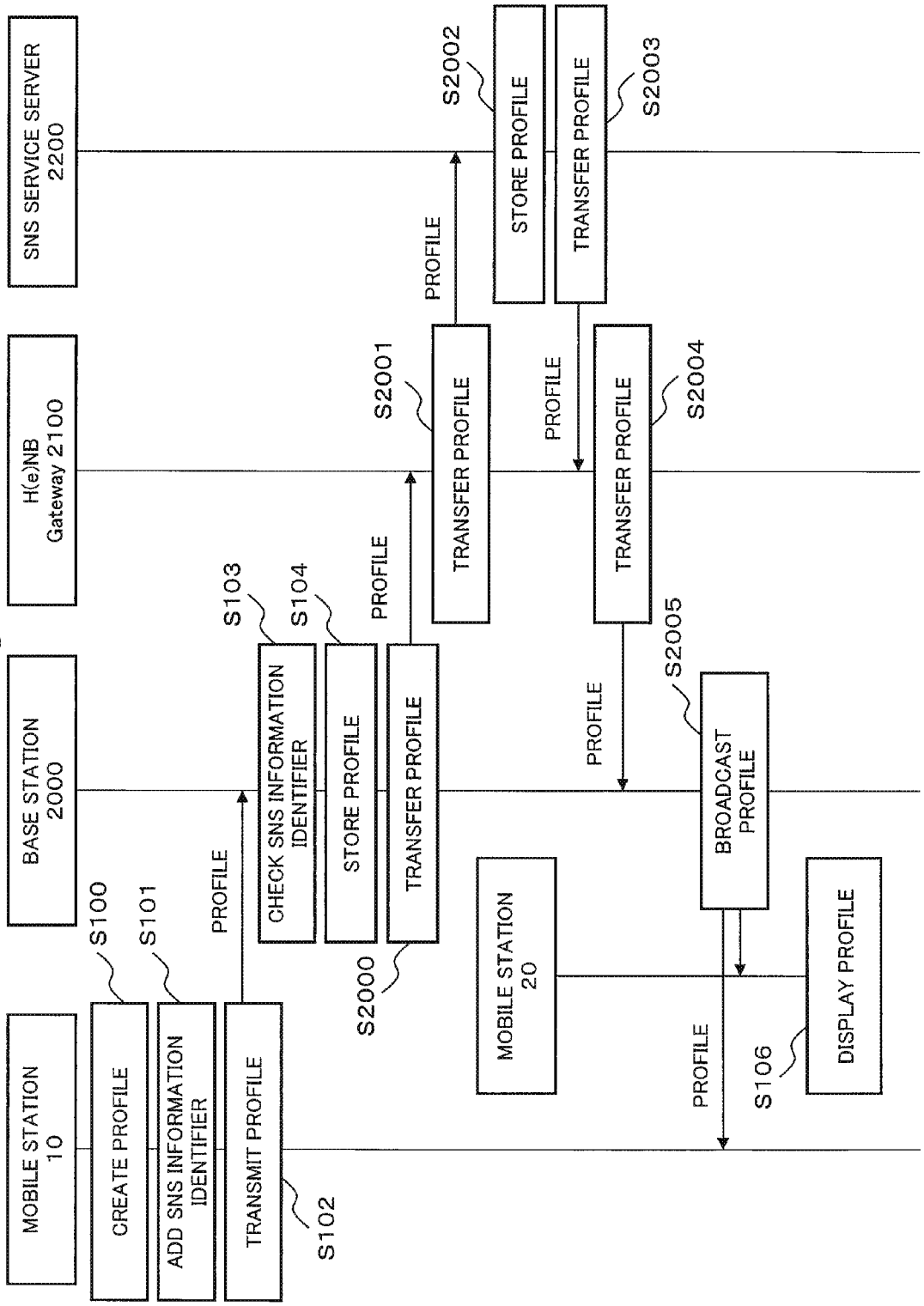
FIG. 27 is a flowchart for illustrating operation of the wireless communication system according to the eighth embodiment of the present invention.

FIG. 27 is a flowchart for illustrating operation of the wireless communication system according to the eighth embodiment of the present invention.

The SNS information distribution determining unit 2120 of the base station 2000 performs the operations in S103 and S104 described above, and then outputs the stored data including the user profile to the H(e)NB Gateway 2100 (S2000).

Then, the H(e)NB Gateway 2100 outputs the data including the user profile input by the SNS information distribution determining unit 2120 of the base station 2000, to the SNS service server 2200 (S2001).

Subsequently, the SNS service server 2200 stores the data including the user profile input by the H(e)NB Gateway 2100 (S2002).

Then, the SNS service server 2200 outputs the stored data including the user profile to the H(e)NB Gateway 2100 (S2003).

The H(e)NB Gateway 2100 outputs the data including the user profile input by the SNS service server 2200, to the SNS information distribution determining unit 2120 of the base station 2000 (S2004).

The SNS information distribution determining unit 2120 of the base station 2000 includes the data including the user profile input by the H(e)NB Gateway 2100, in a broadcast signal, and then broadcasts the broadcast signal to the mobile stations 10, 20, and 30 by a known technique (S2005).

Specifically, the SNS information distribution determining unit 2120 removes the SNS information identifier from the data including the user profile and input by the H(e)NB Gateway 2100, creates a broadcast signal including the data after the removal, and outputs the broadcast signal to the wireless communication unit 110. The wireless communication unit 110 performs a known layer-1,2 transmission process specified by the 3GPP (e.g., encoding, modulation, or the like) on the input broadcast signal, and broadcasts the resultant signal to the mobile stations 10, 20, and 30 under the control of the base station 100 by a known technique.

Note that the SNS information distribution determining unit 2120 may include, in S2005, the data including the user profile stored in S104, in a broadcast signal, without using the data including the user profile input by the H(e)NB Gateway 2100.

[Description of Effects]

According to this embodiment, the wireless communication system can distribute SNS data such as a user profile, only to the mobile stations located within an extremely small range of approximately several meters to several tens of meters in radius.

The reason is that the wireless communication system uses an H(e)NB having a cell of approximately several meters to several tens of meters in radius, as the base station 2000.

Ninth Embodiment

Next, the ninth embodiment of the present invention will be described.

[Description of Configuration]

Figure 28:
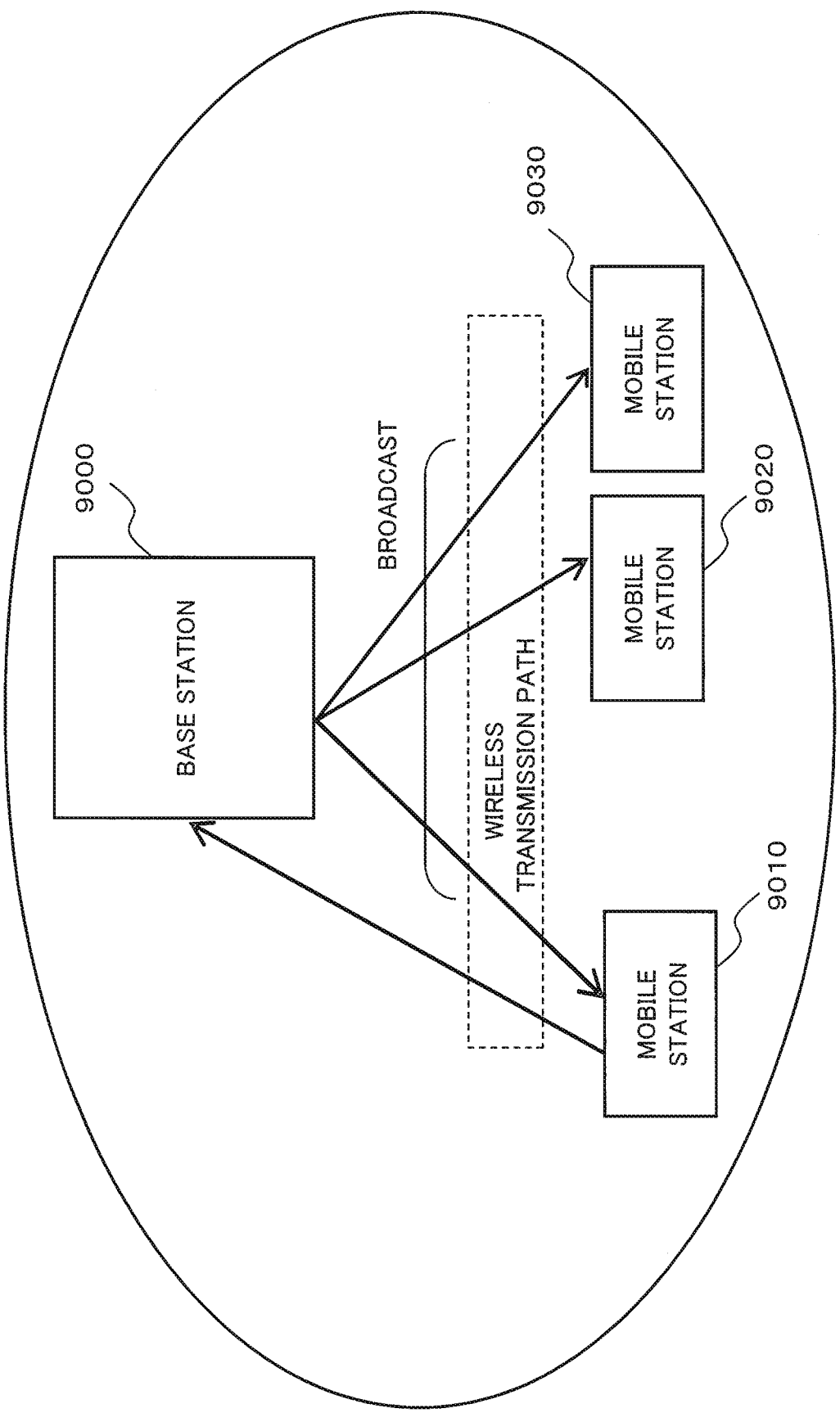
FIG. 28 is a diagram illustrating an example of a configuration of a wireless communication system according to a ninth embodiment of the present invention.

FIG. 28 is a diagram illustrating an example of a configuration of a wireless communication system according to the ninth embodiment of the present invention.

As illustrated in FIG. 28, the wireless communication system according to the ninth embodiment includes a wireless base station device 9000, and mobile stations 9010, 9020, and 9030. The wireless base station device 9000 and each of the mobile stations 9010, 9020, and 9030 are connected via a wireless transmission path. Although FIG. 28 presents a case in which the wireless communication system according to the ninth embodiment includes three mobile stations, the number of mobile stations is not limited to this. The wireless communication system according to the ninth embodiment may include two mobile stations, or three or more mobile stations.

The mobile stations 9010, 9020, and 9030 have the same functions and configuration. Specifically, each of the mobile stations 9010, 9020, and 9030 is a mobile station that transmits data to the wireless base station device 9000 of the cell in which the mobile station is located, and includes an information identifier assigning unit. When the data to transmit is data of a particular kind, the information identifier assigning unit of each of the mobile stations 9010, 9020, and 9030 assigns an identifier indicating that the data is of the predetermined kind, to the data to transmit.

The wireless base station device 9000 is a wireless base station device that broadcasts a signal to the mobile stations 9010, 9020, and 9030 located in the cell of the wireless base station device 9000, and includes an information broadcast determining unit. When the identifier indicating that the data is of the predetermined kind is assigned to the data received from any of the mobile stations 9010, 9020, and 9030, the information broadcast determining unit removes the identifier from the received data, and generates a signal including the data after the removal.

[Description of Operation]

When data to transmit is data of the predetermined kind, the information identifier assigning unit of the mobile station 9010 assigns an identifier indicating that the data is of the predetermined kind, to the data to transmit. The data of the predetermined kind may be SNS data. The mobile station 9010 transmits the data to which the identifier indicating that the data is of the predetermined kind (referred to as an "information identifier" below) is assigned, to the wireless base station device 9000.

When the information identifier is assigned to the data received from the mobile station 9010 (referred to as "received data" below), the information broadcast determining unit of the wireless base station device 9000 removes the identifier from the received data, and generates a signal including the data after the removal. The signal may be a signal to distribute broadcast information, for example. The wireless base station device 9000 broadcasts the generated signal to the mobile stations 9010, 9020, and 9030.

[Description of Effects]

According to this embodiment, the wireless communication system can limit the users to share information to those located within a certain area.

The reason is that a mobile station assigns an information identifier to data of a predetermined kind, and the base station checks whether the received data is data of the predetermined kind on the basis of the presence or absence of the information identifier, and broadcasts, when the received data is data of the predetermined kind, the data to the mobile stations under the cell of the base station. As a result, the data of the predetermined kind is distributed only to the users under the cell of the base station. Hence, the wireless communication system of this embodiment can limit the users to share information to those located in a certain area (within the cell under the control of the base station).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims Moreover, although each of the above-described embodiments uses SNS data, data to use is not limited to SNS data.

This application is based upon and claims the benefit of priority from Japanese Patent Application No. 2012-156465 filed on Jul. 12, 2012, the disclosure of which is incorporated herein in its entirety by reference.

Furthermore, the whole or part of the exemplary embodiments disclosed above can be described as, but not limited to, the following supplementary notes.

(Supplementary Note 1)

A wireless base station device for broadcasting a signal to a mobile station located in a cell of the wireless base station device, the wireless base station device comprising an information distribution determining means for, when an identifier indicating that data is of a predetermined kind is assigned to data received from the mobile station, removing the identifier from the data and generating the signal including the data from which the identifier is removed.

(Supplementary Note 2)

The wireless base station device according to Supplementary Note 1, wherein the signal is a signal to distribute broadcast information.

(Supplementary Note 3)

The wireless base station device according to Supplementary Note 1, wherein the signal is an emergency-earthquake-early-warning distribution signal.

(Supplementary Note 4)

The wireless base station device according to any one of Supplementary Notes 1 to 3, wherein the information distribution determining means transfers the data received from the mobile station, to the wireless base station device that is adjacent, when the identifier is assigned to the data, while removing the identifier from the data and generating the signal including the data from which the identifier is removed, when the data is transferred by the adjacent wireless base station device.

(Supplementary Note 5)

The wireless base station device according to any one of Supplementary Notes 1 to 4, wherein the information distribution determining means removes the identifier from the data and generates the signal including the data from which the identifier is removed, when the mobile station that transmitted the data has been located in the cell of the wireless base station device in a time period longer than or equal to a predetermined time period.

(Supplementary Note 6)

A mobile station that transmits data to a wireless base station device of a cell in which the mobile station is located, the mobile station comprising an information identifier assigning means for assigning, when the data to transmit is data of a predetermined kind, an identifier indicating that the data is of the predetermined kind, to the data.

(Supplementary Note 7)

The mobile station according to Supplementary Note 6, wherein the information identifier assigning means assigns the identifier to the data only when a time period in which the mobile station has been located in the cell of the wireless base station device is shorter than or equal to a predetermined time period.

(Supplementary Note 8)

A wireless communication system that distributes data from a wireless base station device to a mobile station, wherein the wireless base station device is the wireless base station device according to any one of Supplementary Notes 1 to 5, and the mobile station is the mobile station according to any one of Supplementary Notes 6 and 7.

(Supplementary Note 9)

The wireless communication system according to Supplementary Note 8, wherein the wireless communication system includes at least one mobile station that corresponds to the mobile station, a plurality of wireless base station devices each of which corresponds to the wireless base station device, and a control device connected to the wireless base station devices, when the identifier is assigned to the data received from the mobile station, the information distribution determining means of each of the wireless base station devices notifies the control device of the data, the control device judges, upon notification of the data from the information distribution determining means, whether the mobile station that transmitted the data is performing a handover, detects, when the mobile station is performing a handover, the mobile station that has the same handover-source base station and handover-destination mobile station, and notifies the information distribution determining means included in the wireless base station device of the cell in which the detected mobile station is located, of the data, and, upon notification of the data from the control device, the information distribution determining means removes the identifier from the data and generates the signal including the data from which the identifier is removed.

(Supplementary Note 10)

A data distribution method for distributing data from a wireless base station device to a mobile station, comprising:

when the data to transmit is of a predetermined kind, the mobile station assigning an identifier indicating that the data is of the predetermined kind, to the data, and transmitting the data to the wireless base station device; and, when the identifier is assigned to the data received from the mobile station, the wireless base station device removing the identifier from the data, and broadcasting the data from which the identifier is removed, to the mobile station.

(Supplementary Note 11)

The wireless base station device according to any one of Supplementary Notes 1 to 5, wherein the data of the predetermined kind is SNS (Social Networking Service) data.

(Supplementary Note 12)

The wireless base station device according to any one of Supplementary Notes 1 to 5 or Supplementary Note 11, wherein the signal is a CBS (Cell Broadcast Service) signal.

(Supplementary Note 13)

The wireless base station device according to any one of Supplementary Notes 3 to 5, wherein the emergency-earthquake-early-warning distribution signal is a signal of ETWS (Earthquake and Tsunami Warning System).

(Supplementary Note 14)

The wireless base station device according to any one of Supplementary Notes 3 to 5, wherein the emergency-earthquake-early-warning distribution signal is a signal of MAS (Commercial Mobile Alert System).

(Supplementary Note 15)

The wireless base station device according to any one of Supplementary Notes 3 to 5, wherein the emergency-earthquake-early-warning distribution signal is a signal of KPAS (Korea Public Alert System).

(Supplementary Note 16)

The wireless base station device according to any one of Supplementary Notes 1 to 5 or Supplementary Notes 11 and 12, wherein the wireless base station device is an H(e)NB Gateway (Home (e)NodeB Gateway).

(Supplementary Note 17)

The wireless communication system according to Supplementary Note 8, wherein the wireless communication system includes at least one mobile station, a plurality of wireless base station devices, and a control device connected to a wireless base station devices, each of the wireless base station devices is a wireless base station device that distributes an MBMS (Multimedia Broadcast and Multicast Service) multicast mode signal to a mobile station located in a cell of the wireless base station device, when the identifier is assigned to the data received from the mobile station, the information distribution determining means of the wireless base station device notifies the control device of the data, the control device judges, upon notification of the data from the information distribution determining means, whether the mobile station that transmitted the data is performing a handover, detects, when the mobile station is performing a handover, the mobile station that has the same handover-source base station and handover-destination mobile station, and notifies the information distribution determining means included in the wireless base station device of the cell in which the detected mobile station is located, of the data, and, upon notification of the data from the control device, the information distribution determining means removes the identifier from the data and generates the MBMS multicast mode signal including the data from which the identifier is removed.

(Supplementary Note 18)

The wireless communication system according to Supplementary Note 8, comprising a location management node that manages a time period in which the mobile station has been located in the cell of the wireless base station device, wherein, upon notification of a message for checking whether locating time of a certain mobile station corresponding to the mobile station is long or short, by the wireless base station device, the location management node notifies the wireless base station device of a message indicating that the locating time is not long, when the locating time is shorter than a predetermined time period, and, upon notification of the message indicating that the locating time is not long from the location management node, the wireless base station device removes the identifier from the data and generates the signal including the data from which the identifier is removed.

(Supplementary Note 19)

The mobile station according to any one of Supplementary Notes 6 and 7, wherein the data of the predetermined kind is SNS data.

(Supplementary Note 20)

The wireless communication system according to any one of Supplementary Notes 8 and 9 or Supplementary Notes 17 and 18, wherein the data of the predetermined kind is SNS data.

(Supplementary Note 21)

The data distribution method according to Supplementary Note 10, wherein the data of the predetermined kind is SNS data.

REFERENCE SIGNS LIST 10, 20, 30, 40, 50, 60, 70, 80, 90, 9010, 9020, 9030 Mobile station
11 Operation display unit
12 SNS information identifier assigning unit
13, 15, 110, 810 Wireless communication unit
14 SNS information identifier assigning unit
100, 200, 300, 400, 500, 600, 800, 900, 1100, 2000 Base station
120, 220, 520, 620, 820, 1120 SNS information distribution determining unit
700 Location management node
1000, 1500 MME
2100 H(e)NB Gateway
2200 SNS service server
900 Wireless base station device

The invention claimed is:

1. A mobile station that transmits data to a wireless base station device of a cell in which the mobile station is located, the mobile station comprising:
an information identifier assigning unit for assigning, when the data to transmit is data of a predetermined kind, an identifier indicating that the data is of the predetermined kind, to the data,
wherein the information identifier assigning unit assigns the identifier to the data only when a time period in which the mobile station has been located in the cell of the wireless base station device is shorter than or equal to a predetermined time period.

2. A wireless communication system that distributes data from a wireless base station device to a mobile station,
wherein the wireless base station device is configured to broadcast a signal to the mobile station located in a cell of the wireless base station device, the wireless base station device comprising
an information distribution determining unit for, when an identifier indicating that data is of a predetermined kind is assigned to data received from the mobile station, removing the identifier from the data and generating the signal including the data from which the identifier is removed, and
wherein the mobile station transmits data to a wireless base station device of a cell in which the mobile station is located, the mobile station comprising
an information identifier assigning unit for assigning to the data, when the data to transmit is data of a predetermined kind, the identifier indicating that the data is of the predetermined kind, the information identifier assigning unit assigning the identifier to the data only when a time period in which the mobile station has been located in the cell of the wireless base station device is shorter than or equal to a predetermined time period.

3. The wireless communication system according to claim 2, wherein the signal is a signal to distribute broadcast information.

4. The wireless communication system according to claim 2, wherein the signal is an emergency-earthquake-early-warning distribution signal.

5. The wireless communication system according to claim 2, wherein the information distribution determining unit transfers the data received from the mobile station, to the wireless base station device that is adjacent, when the identifier is assigned to the data, while removing the identifier from the data and generating the signal including the data from which the identifier is removed, when the data is transferred by the adjacent wireless base station device.

6. The wireless communication system according to claim 2, wherein the information distribution determining unit removes the identifier from the data and generates the signal including the data from which the identifier is removed, when the mobile station that transmitted the data has been located in the cell of the wireless base station device in a time period longer than or equal to a predetermined time period.

7. A wireless communication system that distributes data from at least one wireless base station device to at least one mobile station,
wherein the wireless base station device is configured to broadcast a signal to the mobile station located in a cell of the wireless base station device, the wireless base station device comprising
an information distribution determining unit for, when an identifier indicating that data is of a predetermined kind is assigned to data received from the mobile station, removing the identifier from the data and generating the signal including the data from which the identifier is removed,
wherein the mobile station transmits data to a wireless base station device of a cell in which the mobile station is located, the mobile station comprising
an information identifier assigning unit for assigning to the data, when the data to transmit is data of a predetermined kind, the identifier indicating that the data is of the predetermined kind, and
wherein the wireless communication system includes the at least one mobile station, a plurality of the wireless base station devices, and a control device connected to the wireless base station devices,
when the identifier is assigned to the data received from the mobile station, the information distribution determining unit of each of the wireless base station devices notifies the control device of the data,
the control device judges, upon notification of the data from the information distribution determining unit, whether the mobile station that transmitted the data is performing a handover, detects, when the mobile station is performing the handover, the mobile station that has the same handover-source base station and handover-destination mobile station, and notifies the information distribution determining unit included in the wireless base station device of the cell in which the detected mobile station is located, of the data, and,
upon notification of the data from the control device, the information distribution determining unit removes the identifier from the data and generates the signal including the data from which the identifier is removed.

8. The wireless communication system according to claim 7, wherein the information identifier assigning unit assigns the identifier to the data only when a time period in which the mobile station has been located in the cell of the wireless base station device is shorter than or equal to a predetermined time period.

9. A wireless communication system that distributes data from a wireless base station device to a mobile station, wherein the wireless base station device is configured to broadcast a signal to the mobile station located in a cell of the wireless base station device, the wireless base station device comprising
    an information distribution determining unit for, when an identifier indicating that data is of a predetermined kind is assigned to data received from the mobile station, removing the identifier from the data and generating the signal including the data from which the identifier is removed,
wherein the mobile station transmits data to a wireless base station device of a cell in which the mobile station is located, the mobile station comprising
    an information identifier assigning unit for assigning to the data, when the data to transmit is data of a predetermined kind, the identifier indicating that the data is of the predetermined kind, and
wherein the wireless communication system includes at least one mobile station, a plurality of wireless base station devices, and a control device connected to a wireless base station devices,
each of the wireless base station devices is a wireless base station device that distributes a Multimedia Broadcast and Multicast Service (MBMS) multicast mode signal to a mobile station located in a cell of the wireless base station device,
when the identifier is assigned to the data received from the mobile station, the information distribution determining unit of the wireless base station device notifies the control device of the data, the control device judges, upon notification of the data from the information distribution determining unit, whether the mobile station that transmitted the data is performing a handover, detects, when the mobile station is performing the handover, the mobile station that has the same handover-source base station and handover-destination mobile station, and notifies the information distribution determining unit included in the wireless base station device of the cell in which the detected mobile station is located, of the data, and,
upon notification of the data from the control device, the information distribution determining unit removes the identifier from the data and generates the MBMS multicast mode signal including the data from which the identifier is removed.

10. The wireless communication system according to claim 9, wherein the information identifier assigning unit assigns the identifier to the data only when a time period in which the mobile station has been located in the cell of the wireless base station device is shorter than or equal to a predetermined time period.

11. A wireless communication system that distributes data from a wireless base station device to a mobile station,
    wherein the wireless base station device is configured to broadcast a signal to the mobile station located in a cell of the wireless base station device, the wireless base station device comprising
        an information distribution determining unit for, when an identifier indicating that data is of a predetermined kind is assigned to data received from the mobile station, removing the identifier from the data and generating the signal including the data from which the identifier is removed,
    wherein the mobile station transmits data to a wireless base station device of a cell in which the mobile station is located, the mobile station comprising
        an information identifier assigning unit for assigning to the data, when the data to transmit is data of a predetermined kind, the identifier indicating that the data is of the predetermined kind, and
    the wireless communication system comprising a location management node that manages a time period in which the mobile station has been located in the cell of the wireless base station device,
    wherein, upon notification of a message for checking whether a locating time of a certain mobile station corresponding to the mobile station is long or short, by the wireless base station device, the location management node notifies the wireless base station device of a message indicating that the locating time is not long, when the locating time is shorter than a predetermined time period, and,
    upon notification of the message indicating that the locating time is not long from the location management node, the wireless base station device removes the identifier from the data and generates the signal including the data from which the identifier is removed.

12. The wireless communication system according to claim 11, wherein the information identifier assigning unit assigns the identifier to the data only when a time period in which the mobile station has been located in the cell of the wireless base station device is shorter than or equal to a predetermined time period.

* * * * *